US010534384B2

(12) United States Patent
Manlove et al.

(10) Patent No.: US 10,534,384 B2
(45) Date of Patent: Jan. 14, 2020

(54) CURRENT MODE SWITCHING REGULATOR AND OPERATING METHOD WITH OFFSET CIRCUITRY TO EMULATE A TRANSIENT LOAD STEP RESPONSE

(71) Applicant: Linear Technology Corporation, Milpitas, CA (US)

(72) Inventors: Gregory Manlove, Colorado Springs, CO (US); James McKenzie, El Paseo, CO (US); Robert Chiacchia, Colorado Springs, CO (US); Yi Ding Gu, Pleasanton, CA (US); Jian Li, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 15/585,399

(22) Filed: May 3, 2017

(65) Prior Publication Data

US 2017/0237345 A1    Aug. 17, 2017

Related U.S. Application Data

(63) Continuation-in-part of application No. 13/764,045, filed on Feb. 11, 2013, now Pat. No. 10,013,003.
(Continued)

(51) Int. Cl.
*H02M 3/156* (2006.01)
*G05F 1/10* (2006.01)
(Continued)

(52) U.S. Cl.
CPC ............... *G05F 1/10* (2013.01); *G05F 1/562* (2013.01); *H02M 1/32* (2013.01); *H02M 3/142* (2013.01);
(Continued)

(58) Field of Classification Search
CPC ............ H02M 3/00; H02M 3/02; H02M 3/04; H02M 3/10; H02M 3/142; H02M 3/145;
(Continued)

(56) References Cited

U.S. PATENT DOCUMENTS 5,929,620 A * 7/1999 Dobkin ................... G05F 1/565
323/285
6,646,426 B2 11/2003 Terashi
(Continued)

FOREIGN PATENT DOCUMENTS

CN  101800474 A  8/2010

OTHER PUBLICATIONS

Non-Final Office Action U.S. Appl. No. 13/764,045 dated May 20, 2014.
(Continued)

*Primary Examiner* — Gary L Laxton
*Assistant Examiner* — Carlos O Rivera-Perez
(74) *Attorney, Agent, or Firm* — Schwegman Lundberg & Woessner, P.A.

(57) ABSTRACT

A current mode switching regulator circuit and operating method includes a variable duty cycle power switch controller, a voltage feedback loop that provides a feedback signal based on the output voltage, a current feedback loop that provides a current sense signal based on the output current, and an offset circuit having an external signal input and coupled to the current feedback loop. The power switch controller controls the switching regulator circuit to generate an output voltage and an output current. The offset circuit is configured to provide an offset output control signal, independently of the voltage feedback loop, to control the power switch controller so as to vary a duty cycle of the power switch controller based on the current sense signal and an external offset signal applied to the external signal input.

20 Claims, 16 Drawing Sheets

Related U.S. Application Data

(60) Provisional application No. 61/727,408, filed on Nov. 16, 2012.

(51) Int. Cl.
- G05F 1/56 (2006.01)
- H02M 1/32 (2007.01)
- H02M 3/142 (2006.01)
- H02M 3/158 (2006.01)
- H02M 1/00 (2006.01)

(52) U.S. Cl.
CPC ........... H02M 3/156 (2013.01); H02M 3/158 (2013.01); *H02M 2001/0019* (2013.01); *H02M 2001/0025* (2013.01)

(58) Field of Classification Search
CPC .... H02M 3/155; H02M 3/156; H02M 3/1563; H02M 3/157; H02M 3/158; H02M 3/1582; H02M 3/1588; H02M 1/08; H02M 1/14; H02M 1/32; H02M 2001/0009; H02M 2001/0012; H02M 2001/0016; H02M 2001/0019; H02M 2001/0022; H02M 2001/0025; H02M 2001/0032; H02M 2001/0041; H02M 2003/1566; G05F 1/10; G05F 1/46; G05F 1/56; G05F 1/562; Y02B 70/10; Y02B 70/14; Y02B 70/1458; Y02B 70/1466

USPC ........ 323/222–226, 271–277, 280, 282–288, 323/318, 328, 351; 363/123–127; 700/286, 291, 297, 298; 713/300–340

See application file for complete search history.

(56) References Cited

U.S. PATENT DOCUMENTS

| | | |
|---|---|---|
| 7,441,137 B1 | 10/2008 | Mimberg |
| 7,671,575 B1 | 3/2010 | Suzuki et al. |
| 7,863,875 B1 | 1/2011 | Guo et al. |
| 10,013,003 B2 | 7/2018 | Manlove et al. |
| 2002/0135345 A1 | 9/2002 | Terashi |
| 2007/0078568 A1 | 4/2007 | Donaldson et al. |
| 2008/0150500 A1 | 6/2008 | Gurcan |
| 2008/0164859 A1 | 7/2008 | Peng et al. |
| 2008/0258701 A1 | 10/2008 | Liu et al. |
| 2010/0001704 A1 | 1/2010 | Williams |
| 2010/0308654 A1* | 12/2010 | Chen .................... H02M 3/1584 307/31 |
| 2010/0308784 A1 | 12/2010 | Scoones et al. |
| 2010/0320992 A1 | 12/2010 | Dearn |
| 2011/0018513 A1 | 1/2011 | Noda |
| 2011/0101937 A1 | 5/2011 | Dobkin et al. |
| 2013/0320946 A1* | 12/2013 | Luo ........................ H02M 3/158 323/283 |
| 2014/0139198 A1* | 5/2014 | Manlove ............... H02M 3/156 323/282 |
| 2014/0232190 A1 | 8/2014 | Chen |

OTHER PUBLICATIONS

PCT/US2013/062357 International Search Report and Written Opinion, dated Jul. 31, 2014, 10 pages.
Final Office Action U.S. Appl. No. 13/764,045 dated Oct. 31, 2014.
Non-Final Office Action U.S. Appl. No. 13/764,045 dated Mar. 2, 2015.
Final Office Action U.S. Appl. No. 13/764,045 dated Aug. 24, 2015.
"U.S. Appl. No. 13/764,045, Advisory Action dated Dec. 12, 2014", 4 pgs.
"U.S. Appl. No. 13/764,045, Appeal Brief dated Feb. 24, 2016", 18 pgs.
"U.S. Appl. No. 13/764,045, Appeal Brief dated Nov. 4, 2015", 18 pgs.
"U.S. Appl. No. 13/764,045, Decision on Pre-Appeal Brief Request dated Oct. 29, 2015", 2 pgs.
"U.S. Appl. No. 13/754,045, Examiner's Answer to Appeal Brief dated May 18, 2016", 8 pgs.
"U.S. Appl. No. 13/764,045, Notice of Allowance dated Mar. 26, 2018", 5 pgs.
"U.S. Appl. No. 13/754,045, Notice of Non-Compliant Appeal Brief dated Feb. 9, 2016", 2 pgs.
"U.S. Appl. No. 13/764,045, Pre-Appeal Brief Request dated Aug. 27, 2015", 7 pgs.
"U.S. Appl. No. 13/764,045, Reply Brief dated Jun. 10, 2016", 4 pgs.
"U.S. Appl. No. 13/764,045, Response filed May 28, 2015 to Non Final Office Action dated Mar. 2, 2015", 14 pgs.
"U.S. Appl. No. 13/764,045, Response filed Aug. 18, 2014 to Non Final Office Action dated Mar. 2, 2015", 14 pgs.
"U.S. Appl. No. 13/764,045, Response filed Nov. 18, 2014 to Final Office Action dated Oct. 31, 2014", 12 pgs.
"U.S. Appl. No. 13/764,045, Response filed Dec. 15, 2014 to Advisory Action dated Dec. 12, 2014", 13 pgs.

\* cited by examiner

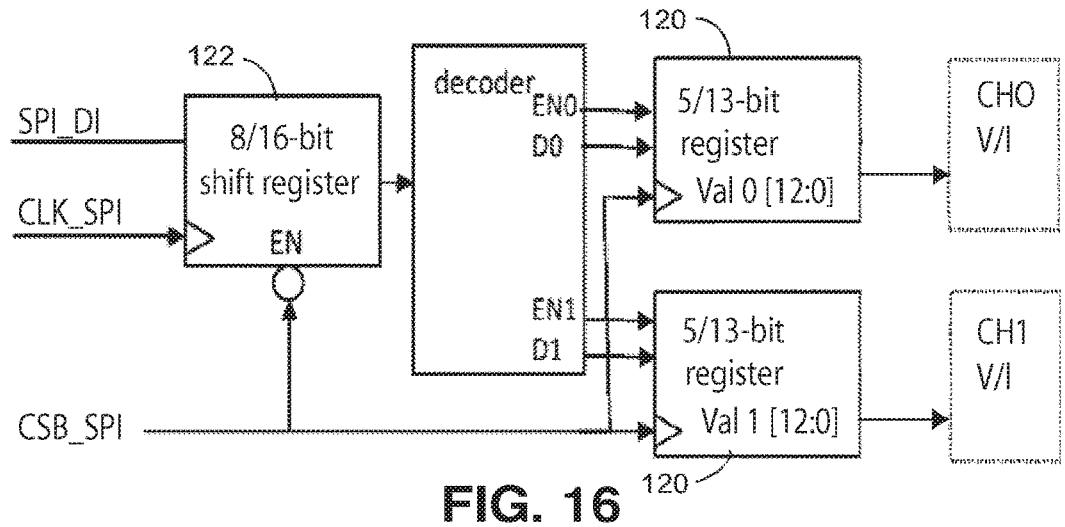
FIG. 16
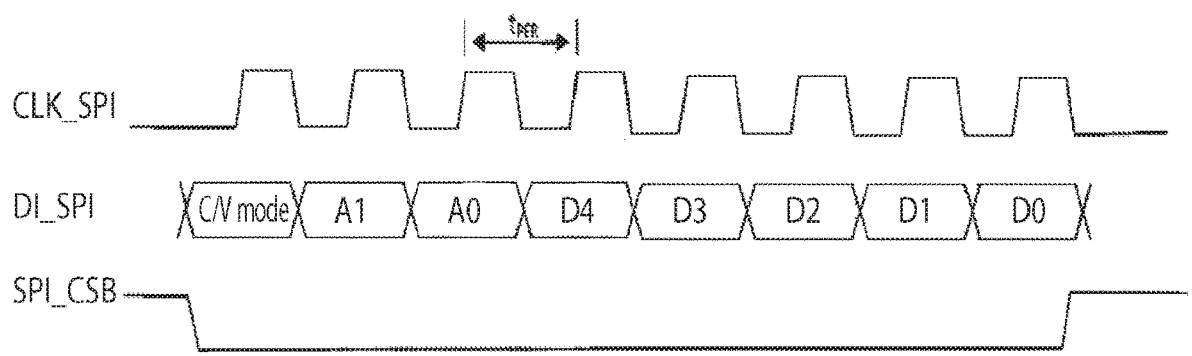
FIG. 17
| A1 | A0 | D4,D3,D2,D1,D0 Offset Data |
|---|---|---|
| 0 | 0 | CH0 Select |
| 0 | 1 | Ch1 Select |
| 1 | X | CH0 and CH1 Select |
FIG. 18

CURRENT MODE SWITCHING REGULATOR AND OPERATING METHOD WITH OFFSET CIRCUITRY TO EMULATE A TRANSIENT LOAD STEP RESPONSE

CROSS-REFERENCE TO RELATED APPLICATIONS

This application claims the benefit of priority under 35 U.S.C. § 120 as a continuation-in-part of U.S. patent application Ser. No. 13/764,045 entitled "Feed Forward Current Mode Switching Regulator With Improved Transient Response," filed on Feb. 11, 2013, which claims priority from U.S. provisional patent application Ser. No. 61/727,408, filed on Nov. 16, 2012, entitled, "Switching Regulator With Improved Transient Response," each of the above applications being hereby expressly incorporated herein by reference in their entirety.

BACKGROUND

The described technology relates to the technical field of switching regulators and, in particular, to a power delivery network that automatically compensates for a load step response produced when the power delivery network is placed under a load condition.

Power delivery networks, such as those in power supplies, may include regulators that switch at frequencies between 100 kHz and 5 MHz. One common type of switching regulator is a current mode regulator. A current mode regulator may include a fast current loop that detects a ramping current through a power switch or through an inductor, and a much slower voltage loop that detects the output voltage. The magnitude of output voltage is dependent upon the magnitude of duty cycle produced by the regulator. A large capacitor connected to the output of the regulator may smooth the output voltage.

A load current generated by the regulator may instantaneously change when a load connected to the regulator goes into or comes out of a standby mode. If, for example, the load comes out of a standby mode, an instantaneous increase in current requirements may draw charge from the output capacitor and cause the output voltage to temporarily droop until the next switching cycle. During the next switching cycle, the regulator may detect the lowered output voltage and increase the duty cycle of the power switch to compensate for the increased load current. Correcting for a current transient is a function of the voltage feedback loop bandwidth, and thus may take several clock cycles to complete, resulting in output voltage ripple. This voltage ripple may cause a regulated voltage to transition out of a desired operating range.

Conventional approaches to reducing output voltage ripple from current transients include increasing the size of the output capacitor (C-OUT) and/or reducing the capacitor ESR (equivalent series resistance). These techniques are costly and require significant board space. What is needed is a technique for reducing output voltage ripple in regulators due to load current transients, without significantly increasing load capacitance.

A switching regulator may also adjust its duty cycle based on a feedback voltage and a reference voltage applied to an error amplifier. The feedback voltage may be adjusted by changing the resistor ratio in a resistor divider connected between the output voltage and the input into the error amplifier. Other adjustments to the feedback voltage may be based on the voltage loop. The reaction time of the regulator based on the voltage loop, however, may be on the order of 30 µS or more for only a 0.1 volt step. This delay may occur whether the voltage step is in a positive or negative direction. On the other hand, increasing the bandwidth of the voltage loop bandwidth may adversely impact the phase margin. What is needed therefore is a technique for reducing the delay in reaching a target regulated voltage in response to an external command to change the regulated output voltage.

Additionally, assuring a proper transient load step response to a current load may be a complicated task for a power supply designer. Testing whether a power supply design provides a proper transient response to a load may include applying a load to the output of the power supply regulator and monitoring the signal response of the system to determine whether the regulator can adequately perform under the load. In one example, a high speed adjustable current load may be applied to VOUT while measuring the transient response on an oscilloscope. Also, determining stability of the system may include injecting a variable frequency sinusoidal signal into the closed loop feedback and measuring the gain and phase relationship to this input over the applied frequency range. However, this technique may require an additional resistor in the feedback loop and a sophisticated measurement system.

The foregoing measurement techniques are typically employed under lab conditions and are not utilized in a production environment or in the field, and producing and measuring a transient current load step response in a power supply regulator is not seen as being applicable to large scale manufacturing testing. Moreover, testing a single design prototype in the laboratory does not guarantee that each manufactured device achieves the same standards. Accordingly, what is needed is a way to test power supply regulators during the manufacturing process to achieve better quality control.

SUMMARY

According to various implementations, a current mode switching regulator circuit includes a variable duty cycle power switch controller configured to control the switching regulator circuit so as to generate an output voltage and an output current from the regulator circuit, a voltage feedback loop that provides a feedback signal based on the output voltage, a current feedback loop that provides a current sense signal based on the output current, and an offset circuit, having an external signal input, and coupled to the current feedback loop. The offset circuit is configured to provide an offset output control signal, independently of the voltage feedback loop, to control the power switch controller so as to vary a duty cycle of the power switch controller based on the current sense signal and an external offset signal applied to the external signal input.

In some implementations, the current mode regulator circuit is configured, in response to receiving a signal identifying an imminent load current step (or any other change in load current), to provide an offset output control signal, independently of the voltage feedback loop, to increase or decrease the duty cycle of the power switch at approximately the time of the expected load current step so that the regulator supplies a compensation current to the load at the time of the load current step (with no requirement for the voltage loop to respond), resulting in a substantial reduction in output voltage ripple. The offset may be generated substantially immediately so the compensation occurs before the next clock cycle. Accordingly, the compensation occurs before a deviation in the output voltage due to the current step can be detected.

In some implementations, a load controller is configured to generate a digital signal corresponding to an anticipated load current step (up or down) shortly before the load current step. The signal may set the magnitude of the current step to any resolution. The digital signal may be sent within 0.5 uS of the load current step and, in some implementations, within the clock period of the current mode regulator preceding the current step. A digital-to-analog converter (DAC) converts the digital signal to a scaled analog offset signal. The scaled offset signal (e.g., positive or negative voltage) is summed with a current loop signal to offset a current feedback signal. Since the duty cycle of the power switch is determined, in part, by the detected current feedback signal, the offset creates a false feedback condition that assumes that the current step is already occurring. Thus, the regulator instantaneously reacts to the offset condition to generate more or less current during the switching cycle than would have normally been generated. Accordingly, when the load current changes, the regulator has already reacted to supply the required current to the load, resulting in reduced output voltage ripple.

The external offset signal may be applied immediately after the current step (e.g., within 0.5 uS after) and still reduce ripple as long as the offset signal causes a duty cycle adjustment prior to the regulator reacting to a change in the output voltage. As will be described further, an external offset signal may be applied in the absence of a current step to induce a transient load step response in the output voltage.

In some implementations, in the event that the power switch has already been disabled during a clock cycle (e.g., by the resetting of a flip-flop) at the time of the external offset signal, the offset circuitry is configured to provide a set signal to the flip-flop to re-enable the power switch for that clock cycle. Therefore, the power switch does not have to wait for the next clock cycle to supply added current to the load. In some implementations, the offset condition remains fixed until the load controller transmits another digital code identifying an imminent load current step.

In some implementations, an external offset signal may be applied to the current loop or to the voltage loop. The current mode regulator may be modified to incorporate the change without affecting the regulator's operation during non-transient conditions. Voltage offsets can be applied to different regulator topologies, for example, in a comparator that triggers based on a current signal.

An external offset signal may also be applied in response to an external command signal for changing the output voltage of the current mode regulator. In addition to modifying the reference voltage or feedback voltage in the voltage loop (e.g., to cause a new regulated output voltage to be generated), a brief offset signal may be applied in the current loop to quickly step the output voltage to the target voltage faster than the voltage loop would have achieved the target voltage in response to the modified feedback voltage. In one example, a current offset is introduced into the fast current loop, such as for 8 uS, to instantaneously supply extra current to the output capacitor for a duration needed to increase the output voltage by 0.1 volt (e.g., to step up its output voltage from 1.8 volts to 1.9 volts). The required extra current and duration to achieve the voltage step may be determined by the equation $I=C\Delta V/\Delta T$.

In some implementations, it may take multiple switching cycles to reach a desired current and/or voltage. The magnitude and duration of the external offset signal (which increases the on-time of the power switch) may be calculated based on the capacitance and a size of a desired voltage step to be produced by the circuit. The external offset signal may also be applied in the current loop to decrease the on-time of the power switch for a brief period. Once the output capacitor has been charged to the desired output voltage, and the external offset signal has been removed, the regulator maintains and/or adjusts the output voltage based on a reference voltage or feedback voltage in the voltage loop. In this regard, implementations of the external offset signal within regulator circuits have been shown to provide a 3× improvement in the voltage transient response over adjustments based on conventional voltage loops.

Accordingly, the current mode regulator circuit of the described technology is configured to, in response to an external offset signal, adjust the duty cycle to compensate a load step response generated by a load, or to generate an emulated load step response in the output voltage without an additional load on the output voltage being detected. The load step response is then corrected by the power switch controller based on feedback signals within the regulator circuit a period of time after the load step response is generated.

It is understood that other configurations of the described technology will become readily apparent from the following detailed description, wherein various configurations of the described technology are shown and described by way of illustration. As will be realized, the described technology is capable of other and different configurations and its several details are capable of modification in various other respects, all without departing from the scope of the described technology. Accordingly, the drawings and detailed description are to be regarded as illustrative in nature and not as restrictive.

BRIEF DESCRIPTIONS OF DRAWINGS

FIG. 16 shows an exemplary digital control circuit for use in connection with an offset circuit.

FIG. 17 shows exemplary data and clock signals for use in connection with the digital control circuit.

FIG. 18 shows exemplary digital bits for use in connection with the digital control circuit.

DETAILED DESCRIPTION

Figure 1:
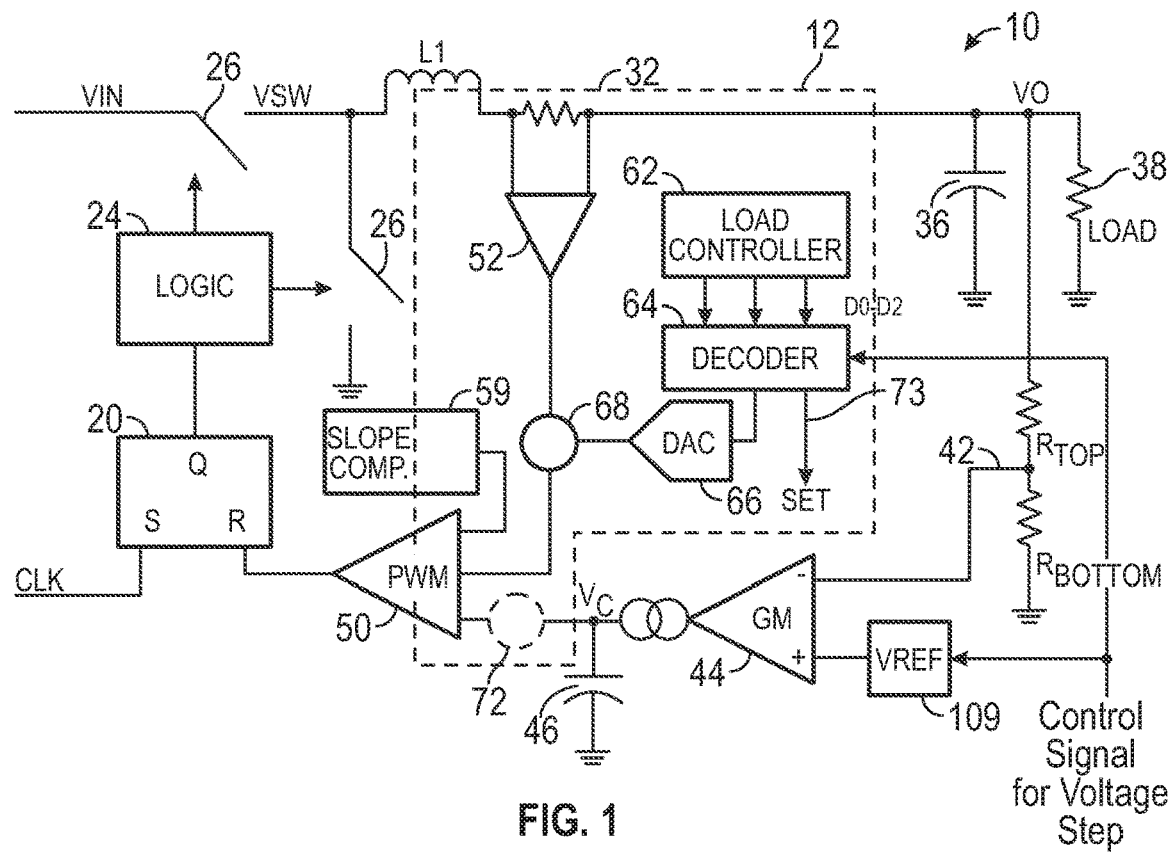
FIG. 1 shows a first exemplary current mode switching regulator circuit augmented with exemplary offset circuitry for compensating a load step response generated in response to a load or for generating a load step response without an additional load being detected, according to various aspects of the described technology.

FIG. 1 shows a first exemplary current mode switching regulator circuit 10 (e.g., a peak current mode DC/DC converter) augmented with an offset circuit 12, according to various aspects of the described technology. The output voltage (Vo) and output current of circuit 10 is produced by an average duty cycle of a current source 26, 28 across L1, filtered by capacitor 36 (e.g., nominally equal to duty cycle times VIN).

The magnitude of the output voltage and output current is based upon the magnitude of duty cycle produced by regulator circuit 10. In this regard, the duty cycle of circuit 10 is set by a power switch controller, including a comparator 50 and a corresponding RS flip flop (or latch) 20 controlled by a clock (CLK) signal and the output of the comparator. According to various implementations, the setting of the RS flip flop 20 generates a high signal at its Q output. A logic circuit 24, in response, turns the transistor switch 26 (the power switch) on and turns the synchronous rectifier switch 28 off. Both switches may be MOSFETs or other transistors. A diode may replace the depicted synchronous rectifier switch 28. The logic circuit 24 ensures that there is no cross-conduction of switches 26 and 28. Input voltage VIN is applied to an inductor L1 through the switch 26, which causes a ramping current to flow through the inductor L1.

The current I-OUT is measured by (low value) sense resistor 32. The ramping current is filtered by an output capacitor 36, which smoothes the current supplied to the load 38. The output capacitor 36 is relatively large to smooth out ripple.

The output voltage Vo is applied to a voltage divider 42, divided between $R_{TOP}$ and $R_{BOTTOM}$, and the divided voltage is applied to the negative input of a transconductance error amplifier 44. A reference voltage VREF is applied to the positive input of the amplifier 44. The output current of the amplifier 44 corresponds to the difference between the actual output voltage Vo and the desired output voltage. The voltage across a capacitor 46 at the output of the amplifier 44 is adjusted up or down based on the positive or negative output current of the amplifier 44. Such a voltage is referred to as a control voltage Vc or a current threshold voltage. The voltage Vc at the capacitor 46, in conjunction with the inductor ramping current, sets the duty cycle of the switch 26, and the level of the voltage required to equalize the inputs into the amplifier 44.

The control voltage Vc is applied to comparator 50 (also known as a pulse width modulation comparator). The ramping voltage across the sense resistor 32, when the switch 26 is on, is sensed by a differential amplifier 52 (having a certain gain) and, when the output of the amplifier 52 exceeds the control voltage Vc, the comparator 50 is triggered to output a reset signal to the RS flip flop 20. This turns the switch 26 off and turns the synchronous rectifier switch 28 on to discharge the inductor L1, causing a downward ramping current. In this way, the peak current through the inductor L1 for each cycle is regulated to provide an average current at a regulated output voltage Vo to support a given load.

FIG. 1 also shows a slope compensation circuit 59. At high duty cycles (typically greater than 50%), the slope compensation circuit 59 turns off the switch 26 before the inductor current ramp crosses the control voltage Vc to reduce sub-harmonic oscillations that may occur in the current loop at the high duty cycles. The effect of the slope compensation circuit 59 may be unrelated to the operation of offset circuit 12.

Instead of detecting the inductor current through a sense resistor, the current through the inductor L1 may be sensed by detecting the voltage drop across the switch 26 (e.g., a MOSFET) or by detecting the voltage at a capacitor (FIG. 2) in parallel with the inductor L1 that effectively emulates the current through the inductor L1.

The load 38 may be any device which draws a current, such as a computer, which has varying current needs for proper operation. In some implementations, the load 38 may have a low current standby mode when not in use. Upon the user pressing a button, for example, or after a period of time, the load 38 may come out of the sleep mode and draw much more current. Similarly, the load 38 may automatically go into sleep mode after a period of non-use and draw very little current. The load 38 may also be a motor or a display backlight, for example, and draw widely varying currents.

Immediately after the load current changes, there may be a ripple in the output voltage Vo (e.g., a load step response) as the load current undergoes a step change. For example, upon a positive current step, charge is removed from the output capacitor, lowering the output voltage, and there is an extended period before the regulator can react to the lowered output voltage by increasing the duty cycle and supplying an average current equal to the increased load current. Conversely, when there is a negative current step, too much charge is supplied to the output capacitor, and the output voltage temporarily increases until the regulator can react to the increased output voltage. Such voltage transients may affect the operation of other circuitry on the power bus or may affect operation of the load 38.

In FIG. 1, the load 38 is controlled by a load controller 62. The load controller 62 may be any device that controls the load 38 to draw different currents, such as a CPU, a logic circuit, or even a switch controlled by the user. In the example of the load 38 coming out of a sleep mode, the load controller 62 generates a digital signal shortly before the load current step. In some implementations, the digital signal is generated within 500 ns of the current step. The digital signal (e.g., D0-D2) is applied to a decoder 64 that processes the signal to provide the optimal offset for the regulator given the parameters of regulator and the current step information conveyed by the digital signal. The decoder 64 may process the digital signal differently for different regulators. In some implementations, the digital signals are already customized for the particular regulator. The digital output of the decoder 64 may be converted to an analog voltage by a digital 20 to-analog converter (DAC) 66.

An offset summer circuit 68 (including, e.g., a voltage summer) adds the analog signal (which may be positive or negative) to the current sense signal output by the amplifier 52 to offset the current sense signal. In the case of a positive load current step, the offset lowers the current feedback signal into the comparator 50 to keep the power switch 26 on longer than it would normally have been on (assuming the power switch is already on). In other words, the ramping of the current through the power switch 26 continues a longer time to supply excess charge to the output capacitor shortly before or simultaneously with the positive load current step. When a current step occurs, the increased current drawn by the load 38 is supplied by the additional charge already being supplied to the output capacitor. The offset may be fixed for the entire length of the current step. In some implementations, the offset may taper off over a few clock cycles to smoothly transition into the regulator's normal operation to minimize output voltage ripple.

Before or simultaneously with the end of the current step, the load controller issues another digital signal to cause the offset to be extinguished. This substantially immediately adjusts the duty cycle to account for the change in load current prior to the regulator reacting to any change in the output voltage, reducing the output voltage ripple.

In some implementations, the external offset signal may be applied to the voltage feedback loop by way of a summer circuit 72 (including, e.g., a voltage summer), indicated as optional by a dashed outline. For an exemplary positive load current step, the offset may raise the control voltage applied the comparator 50 to keep the power switch 26 on longer.

In the event of a negative load current step, the external offset signal would be applied inversely to immediately reduce the peak current through the power switch 26, prior to or simultaneously with the negative current step.

According to various implementations, the external offset signal occurs independently of the clock Clk pulses so there is no delay in the compensation, and the compensation occurs prior to the regulator reacting to any output voltage change.

In the event that the power switch 26 has already been turned off during a clock cycle by the flip-flop 20 being reset, the decoder 64 or other circuit may generate a set signal 73 for the flip-flop 20 to turn the power switch 26 back on, thus providing two current pulses in a single clock cycle.

Figure 2:
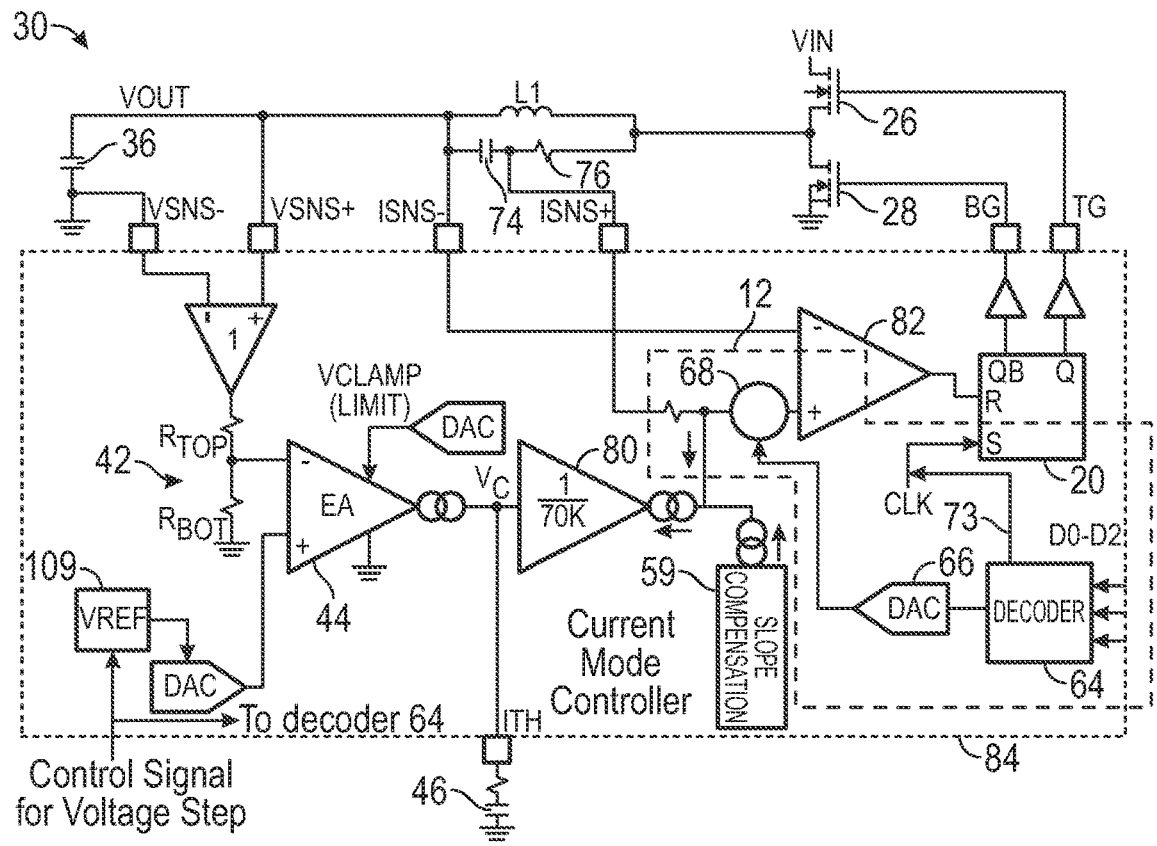
FIG. 2 shows a second exemplary current mode switching regulator circuit augmented with exemplary offset circuitry.

FIG. 2 shows a second exemplary current mode switching regulator circuit 30 augmented with exemplary offset circuitry 12, in accordance with various aspects of the described technology. In FIG. 2, instead of sense resistor 32, a capacitor 74 and resistor 76 are optionally connected in parallel with the inductor L1, and the voltage across the capacitor 74 emulates the current through the inductor L1. As described above with regard to FIG. 1, the (emulated) sensed voltage is offset by the offset summer circuit 68 to compensate for load current steps. A buffer 80 scales and buffers the ITH signal at the output of the error amplifier 44, and, in normal operation, the buffered output adjusts the time that the rising ISNS+ voltage crosses the ISNS− voltage to trigger the comparator 82 to reset the flip-flop 20. The comparator 82 may be referred to as a current comparator. The offset summer circuit 68 adds to or subtracts from the ISNS+ signal to delay or accelerate the resetting of the flip-flop 20 to compensate for the anticipated load current step. While these features are shown as in the circuit of FIG. 2, these features are interchangeable with the comparable features in FIG. 1 (and in FIG. 21).

The regulator control circuitry within the dashed outline 84 may be formed as a single integrated circuit.

In some implementations, a separate decoder 64 is omitted and the load controller 62 (FIG. 1) generates digital signals D0-D2 that are already customized for the particular regulator used. However, using a separate customized decoder 64 may enable the digital signals D0-D2 to be generic for a variety of regulators augmented with the offset circuitry. Alternatively, the signals from the load controller 62 may be already in analog form and appropriately scaled so that a separate DAC 66 and decoder 64 are not needed.

There may be any number of bits in the digital signal, depending on the desired compensation resolution and other factors. The digital signals may be in parallel or serial. Multiple regulators or channels may be controlled with the same set of digital signals.

The digital signal for the offset need not be generated for all load current transients but only for large current steps that may create unacceptable voltage ripples.

Figure 3:
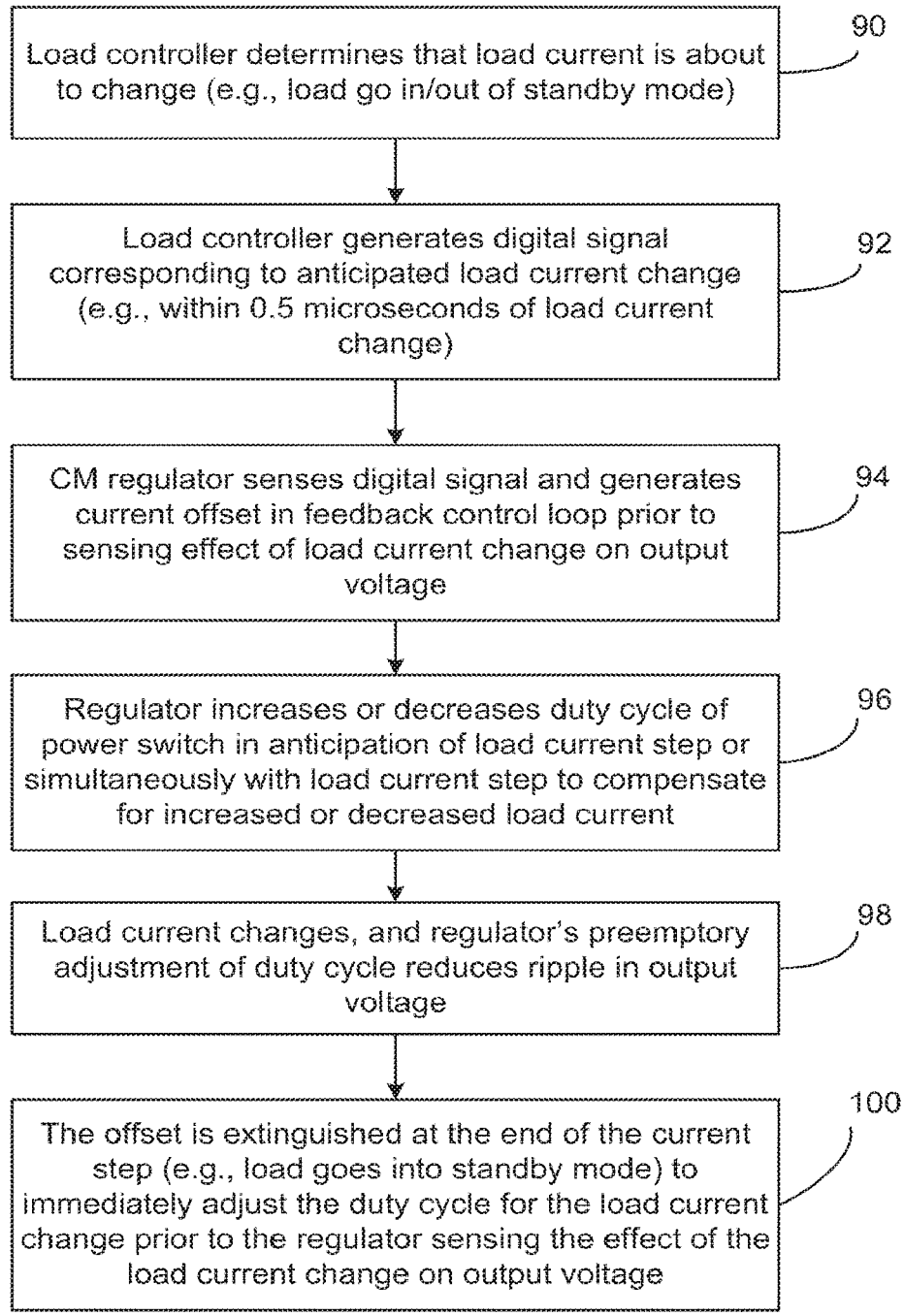
FIG. 3 is a flowchart identifying exemplary steps for compensating an exemplary load current step.

FIG. 3 is a flowchart identifying various exemplary steps performed when carrying out aspects of the described technology.

In step 90, a load controller 62, or other suitable circuit that can be programmed with advanced notice of a load current step, and/or determine in real time that the load current is about to change. For example, load controller 62 may be programmed, in advance, to first apply the load (e.g., by taking the load out of a standby mode) and then, within a predetermined period of time, apply the external offset signal at an external signal input of offset circuit 12 (e.g., by way of DAC 66). In another example, load 38 may transmit a load signal to load controller 62 prior to being introduced in the circuit.

In step 92, the load controller generates a digital signal corresponding to the load current change. The digital signal may identify the magnitude and direction of the load current change to any resolution. This digital signal is provided with sufficient time for the offset circuitry to respond just prior to the current step or concurrently with the current step, so that the regulator does not need to wait for a transient in the output voltage to compensate for the current step.

In step 94, the regulator senses the digital signal and generates an external current offset signal in a feedback control loop of the regulator. The feedback control loop may directly adjust the current comparator offset or may adjust the compensation voltage which, in turn, adjusts the current comparator offset. The external signal occurs prior to (without) the sensing of any output voltage transient due to the load current step. The external offset signal may exist for the entire length of the current step or taper off over multiple clock cycles while still reducing the output voltage ripple.

In step 96, in response to the external offset signal, the regulator increases or decreases the duty cycle of the power switch in preparation for the increase or decrease in load current. This correction may take place a fraction of a clock cycle before the current step or one or more clock cycles before the current step, depending on the magnitude of the current step. The magnitude and timing of the external offset signal are optimized for the current step and the regulator.

In step 98, the load current changes, and the regulator's preemptory adjustment of the duty cycle of the power switch reduces the ripple in the output voltage caused by the load current step.

In step 100, at the end of the current step (e.g., the load current reduces to a starting level after a positive current step), the external offset signal is ended to immediately adjust the duty cycle to account for the lower load current, prior to the regulator reacting to any change in the output voltage. The load controller may transmit another digital signal to end the external offset signal. The optimal timing requirements of external offset signal termination are similar to the timing requirements of the external offset signal being applied. In one implementation, digital signals for predetermined offset signals are stored in the regulator and the load controller triggers the external offset signal with a timing signal.

After the external offset signal has ended and the current comparator returns to the zero offset condition, the offset summer circuit 68 may function like a short circuit in the feedback control loop so that the duty cycle reverts to being controlled based on the output voltage.

Example Test Results

Figure 4:
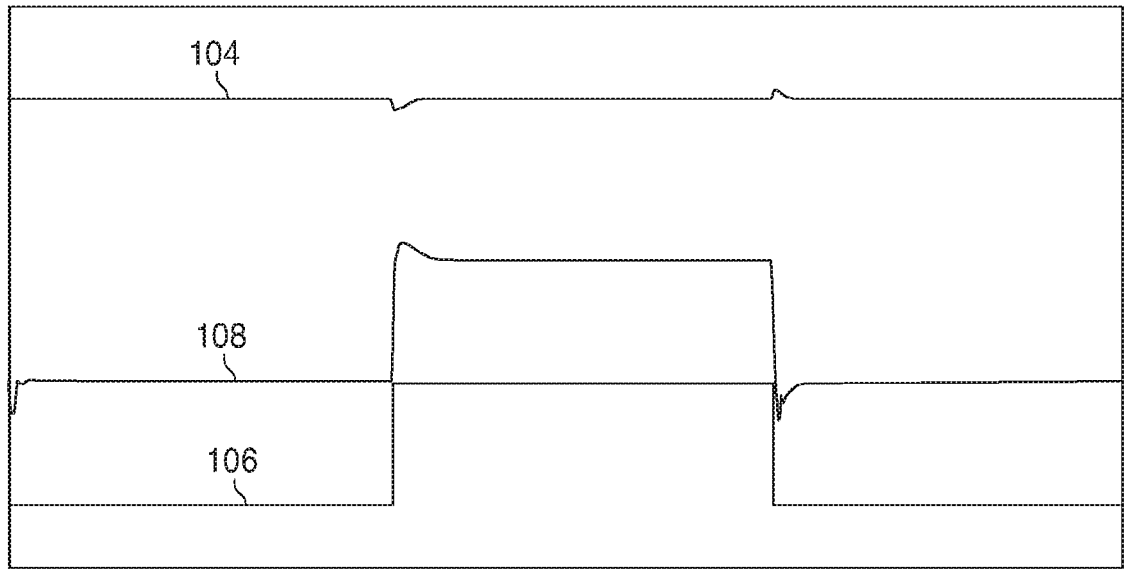
FIG. 4 is a graph of exemplary signals generated in a regulator in response to an exemplary load current step.

FIG. 4 illustrates a transient response of an optimized single-rail current mode loop responding to a 2-15 A current load step. To illustrate the concept, PWM (pulse width modulation) timing uncertainty is ignored for this analysis. The line 104 is VOUT; the line 106 is the load current; and the line 108 is ITH (normally corresponding to a peak current threshold). ITH is representative of the regulator closed loop response to load current, and the ITH pin is shown in FIG. 2. Note the large change in ITH as the output voltage drop is detected, where the ITH signal must rise to increase the duty cycle of the power switch.

Figure 5:
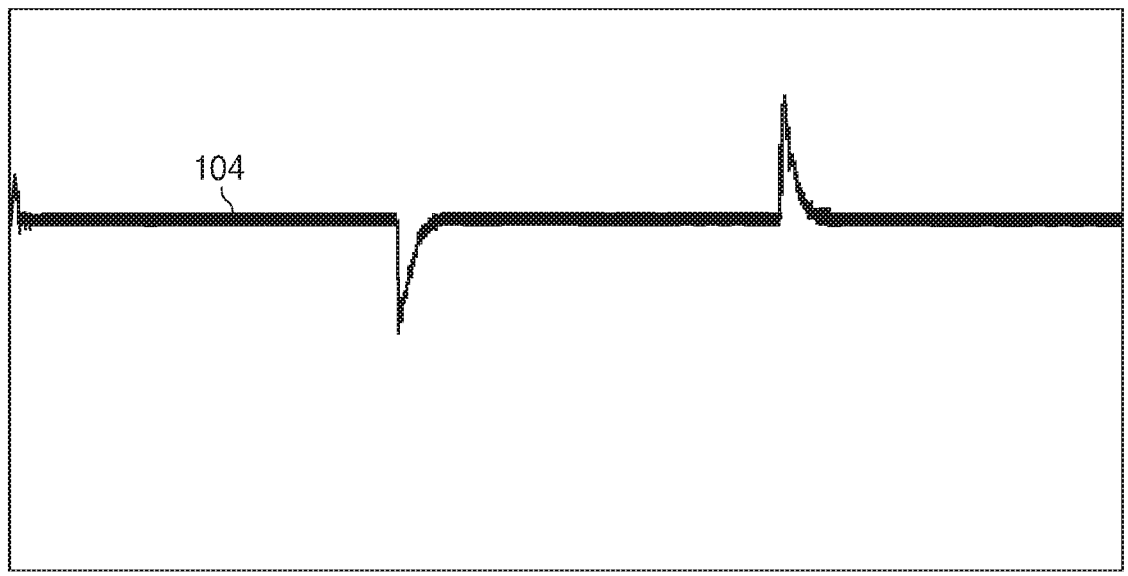
FIG. 5 is a magnified graph of an output voltage generated in a regulator in response to an exemplary load current step.

FIG. 5 is a close-up of the output voltage ripple (line 104), with a peak-peak variation of approximately 100 mV due to a large load current transient. The feedback control loop begins to respond within the first 2 uS PWM clock cycle (assuming a switching frequency of 500 kHz) of a current load step. However, the magnitude of the output voltage transient is a function of the current load step and the feedback control loop bandwidth. The speed of the feedback control loop affects the recovery time, and the magnitude of the output voltage transient is reduced by increasing the output capacitance and minimizing the ESR/ESL of the output capacitors.

The simulation below shows the same current load step applied to the same power stage; however, an offset current is applied to the current comparator at approximately the same instant the current load step occurs.

Figure 6:
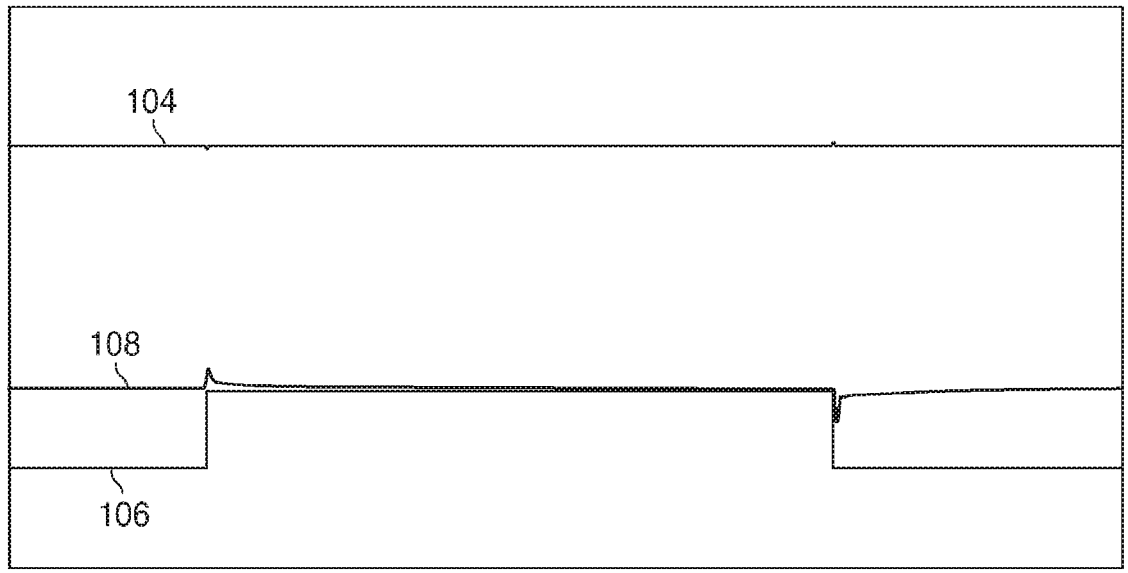
FIG. 6 is a graph of exemplary signals generated in a regulator in response to an exemplary load current step.

FIG. 6 is a graph of exemplary signals generated in a regulator in response to an exemplary load current step taking into account an applied external offset signal. A current feedback signal is offset by an external offset signal and passed into the current comparator 82 (FIG. 2) or comparator 50 (FIG. 1) to compensate for the current step. In contrast to FIG. 4, the ITH line 108 does not move significantly to account for the current load step because the external offset signal has already adjusted the duty cycle for the current step prior to the output voltage drooping.

Figure 7:
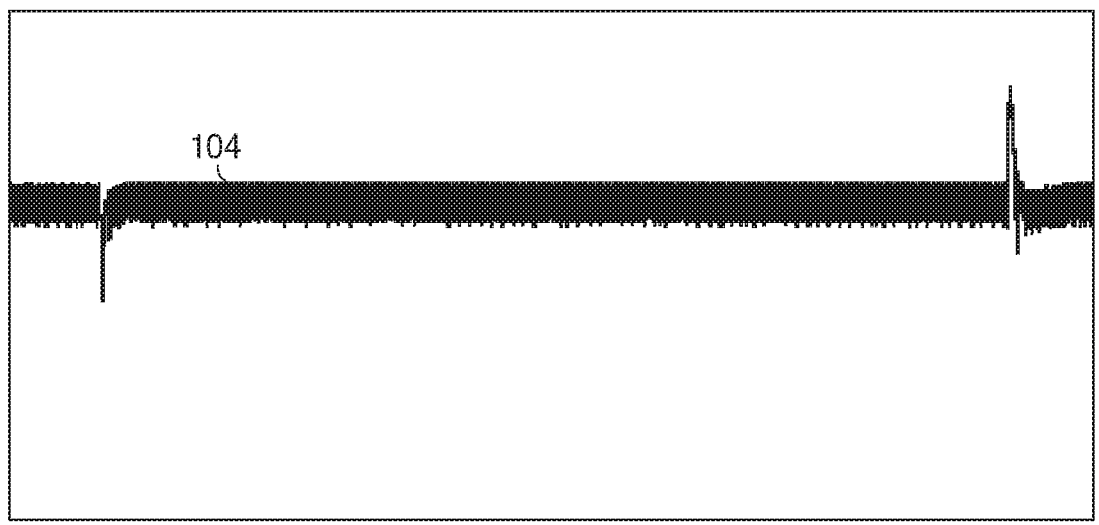
FIG. 7 is a magnified graph of an output voltage in a regulator in response to an exemplary load current step, with reduced output voltage ripple.

FIG. 7 is a close-up of the output voltage ripple (line 104) in FIG. 6, with a peak variation of approximately 25 mV. Note the greatly reduced output voltage spike (4× reduction), and length of the spike, compared to the spike shown in FIG. 5, without an external offset signal applied. This 4× reduction in peak-peak voltage ripple is achieved by adjusting the current comparator offset which, in-turn eliminates the need for the voltage loop to respond.

In various implementations, the alignment of the current comparator offset in time to the current load step determines the voltage peak-peak ripple reduction. The worst case scenario for error would be to apply the offset adjustment when no corresponding load transient is present.

Figure 8:
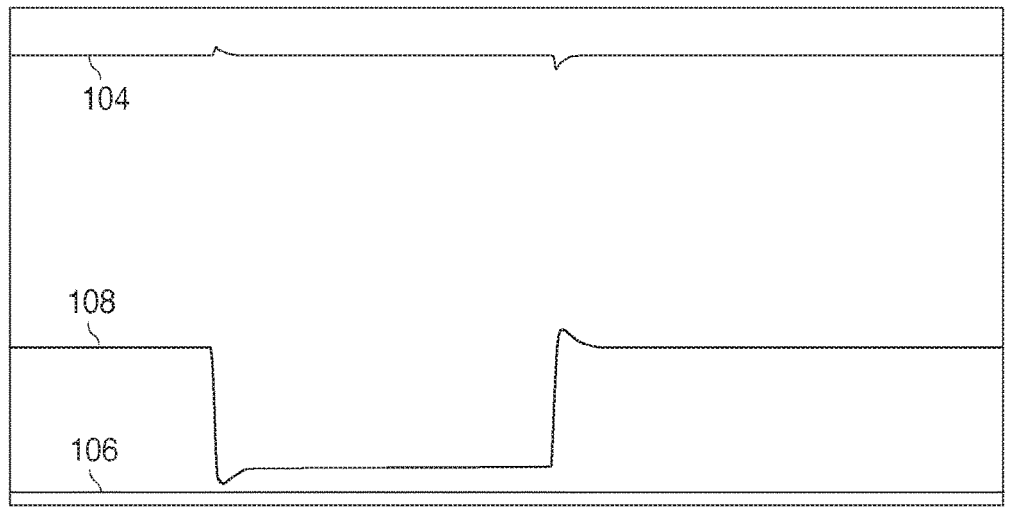
FIG. 8 is a graph of exemplary signals generated in a regulator, in which an exemplary external offset signal is generated to produce a load step response without a load current step.

FIG. 8 shows the simulation results of an offset adjustment of the current comparator with no corresponding current load step. Note the load current line 106 does not move, even though the loop is responding to a transient as shown by the movement in the ITH line 108. The output voltage ripple (line 104), caused by the regulator reacting to the external offset signal at offset summer circuit 68 (see FIGS. 1, 2, and 21), is the same 100 mV peak-peak magnitude; however, the voltage ripple is inverted from an actual current load step. Because the characteristics of the voltage feedback loop have not been modified, the transient response is the same as if a current load step had occurred. This analysis bounds the error if the timing of the current step is not well synchronized to the load transient. The additional fast adjustment may not cause unstable operation but may result in additional voltage ripple on the output. Accordingly, close alignment of the transient current signal and the corresponding current comparator offset adjustment may be desirable.

Minimizing Timing Uncertainty

Some timing uncertainties are too large for the current comparator offset adjustment to have a significant impact on the output ripple. For example, in a single phase application clocked at 500 kHz, there may be a timing uncertainty of 2 uS between when the adjustment signal is received and the current comparator offset effects are processed in the PWM engine. This timing variation may be caused by the clocking control of the PWM engine. After the topside transistor gate voltage (TG) has transitioned low, it cannot go high again until the start of the next PWM clock cycle.

Figure 9:
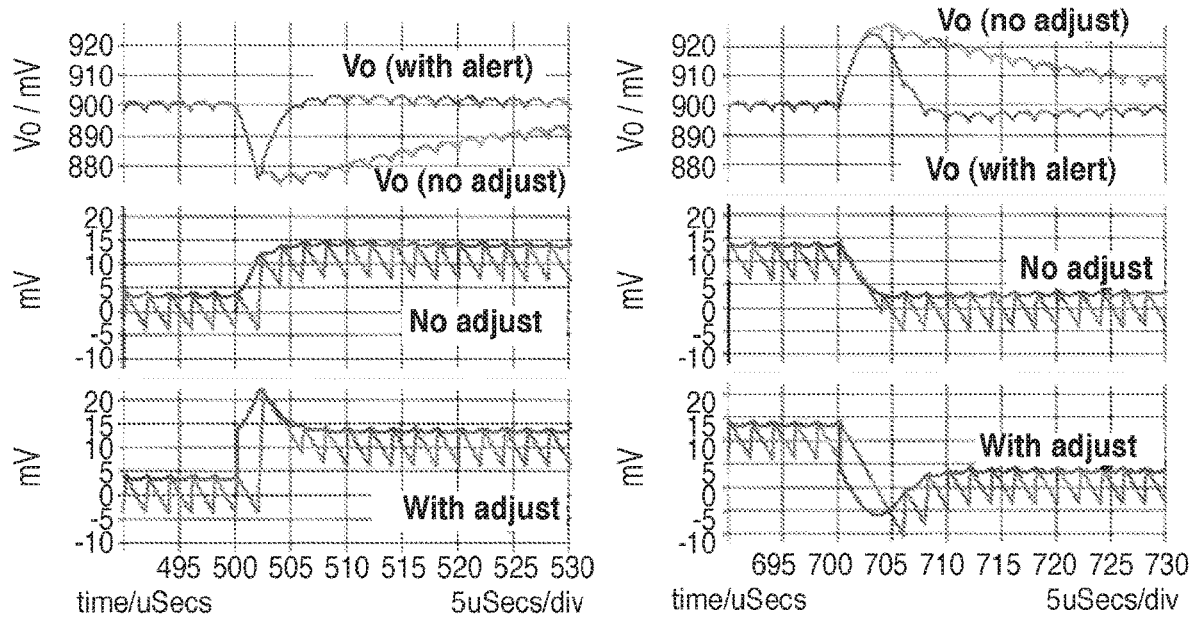
FIG. 9 shows graphs including exemplary effects of an exemplary current comparator offset adjustment with undesirable timing uncertainty.

FIG. 9 illustrates the effects of an exemplary current comparator offset adjustment with undesirable timing uncertainty. For a positive current step, the external offset signal is first applied right after the power switch has turned off during a clock cycle. The external offset signal has no immediate effect at the start of the current step (left side of FIG. 9). The right side of FIG. 9 illustrates the effect of the external offset signal being extinguished too long after the negative current step, rather than ideally immediately before or during the current step. FIG. 9 illustrates the output voltage (Vo) ripple with and without the offset adjustment in one scenario. Note how, even with the adjustment signal present, the voltage transient magnitude is not significantly reduced when there is timing uncertainty since the adjustment came too late. To minimize the timing uncertainty, an additional change is made to the power switch controller to allow an extra TG pulse if the offset adjustment signal is received after TG has transitioned low. This re-enablement of the TG pulse minimizes the timing uncertainty of the power switch controller and allows a single rail implementation to improve transient response significantly. The re-enablement of the TG pulse may be accomplished by the decoder 64 generating a set signal 73 in the event the flip-flop 20 is in a reset state. This effectively adds another current pulse to charge the output capacitor. If the current step is negative, the flip-flop 20 may not controlled to re-enable the TG pulse since the offset is intended to immediately reduce the duty cycle.

Figure 10:
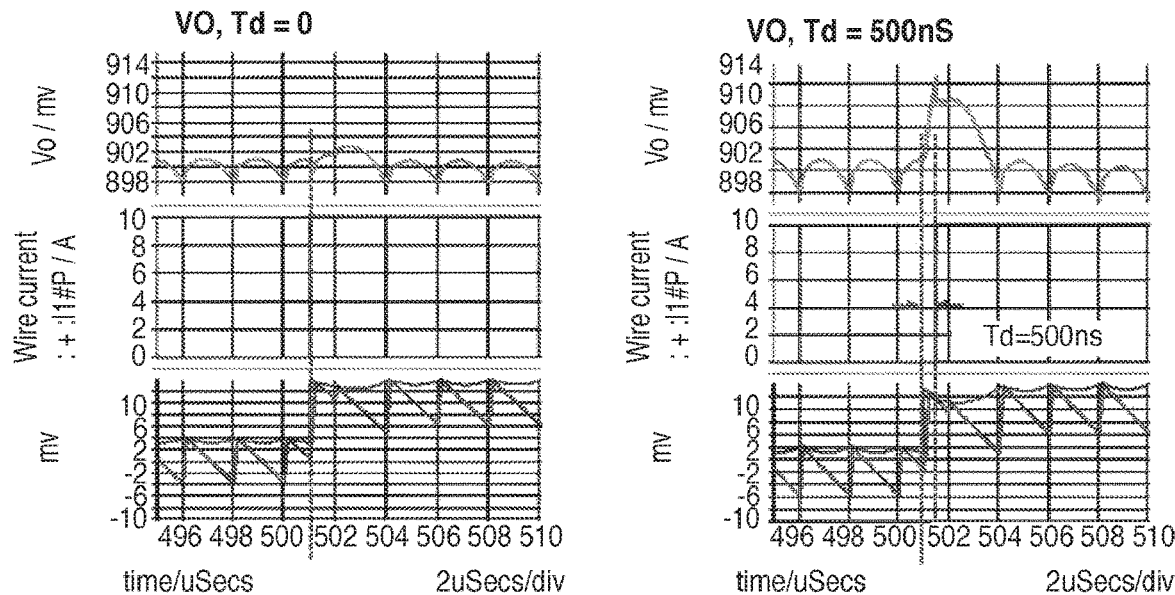
FIG. 10 shows graphs including exemplary effects on output voltage ripple where the timing of an external offset signal corresponds to a timing of a load current step.

FIG. 10 illustrates single rail conditions with a TG pulse reasserted during a PWM cycle, in response to an offset command received for compensating for an imminent positive current step. Note that the graph ranges in FIG. 10 are reduced from those in FIG. 9. A 4-5× reduction in output 16 voltage peak-peak noise is achieved, even when the offset adjustment signal is sent 0.5 uS after the load step occurs. Therefore, in some implementations, the digital signal alerting of the load current step may be transmitted at the time of the current step (e.g., if the offset circuitry can respond within about 0.5 uS).

Multi-Phase Application

For many of the applications where a priori knowledge is available and where the rail currents are very large and the change in load can be substantial, a multi-phase implementation may be used. In a multi-phase implementation, multiple regulators are clocked at the same frequency but set to clock at different phase delays to supply equal currents to the load at the optimal time. The simulations illustrated in FIGS. 11 and 12 were run with a 4-phase circuit clocking at 500 kHz per phase. A current load step of 40 A in 1 uS steps was applied, where each phased regulator supplied a current step of 10 A.

Figure 11:
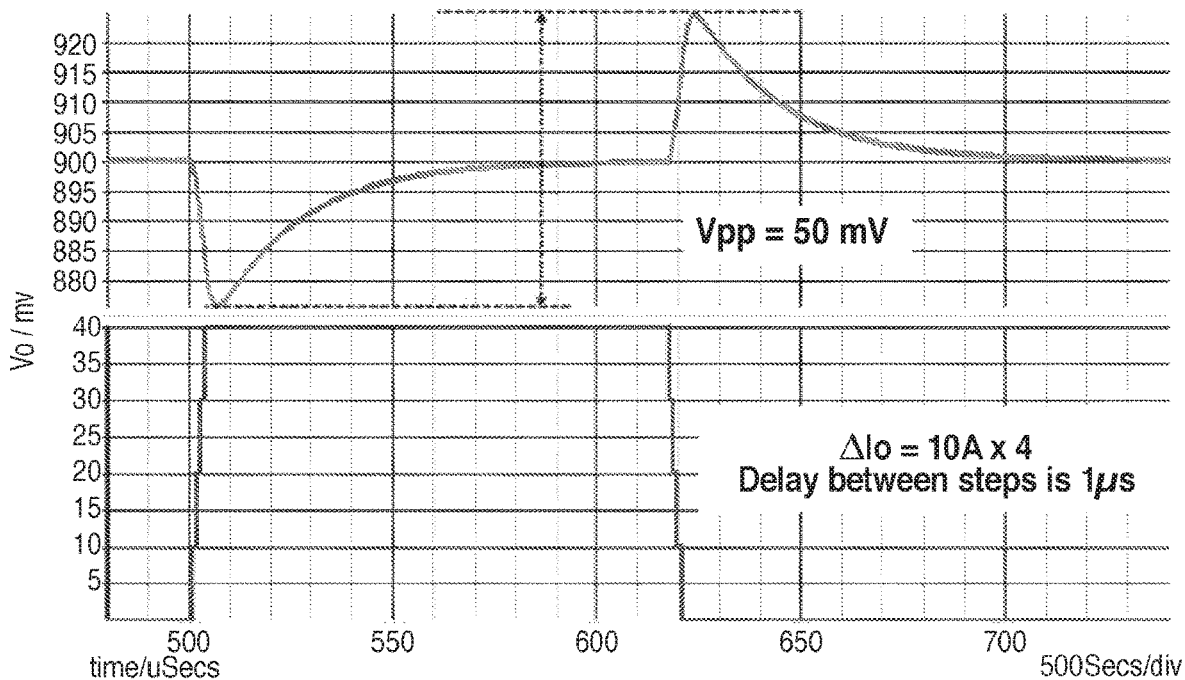
FIG. 11 shows graphs including an exemplary transient response to a load current step in an exemplary 4-phase current mode regulator, resulting in a large output voltage ripple.

FIG. 11 shows a 4-phase transient response to a load current step, where a load current step of 40 A was applied in 10 A increments with a delay between each step of 1 uS. The large output voltage ripple due to the load current step is shown in FIG. 11.

Figure 12:
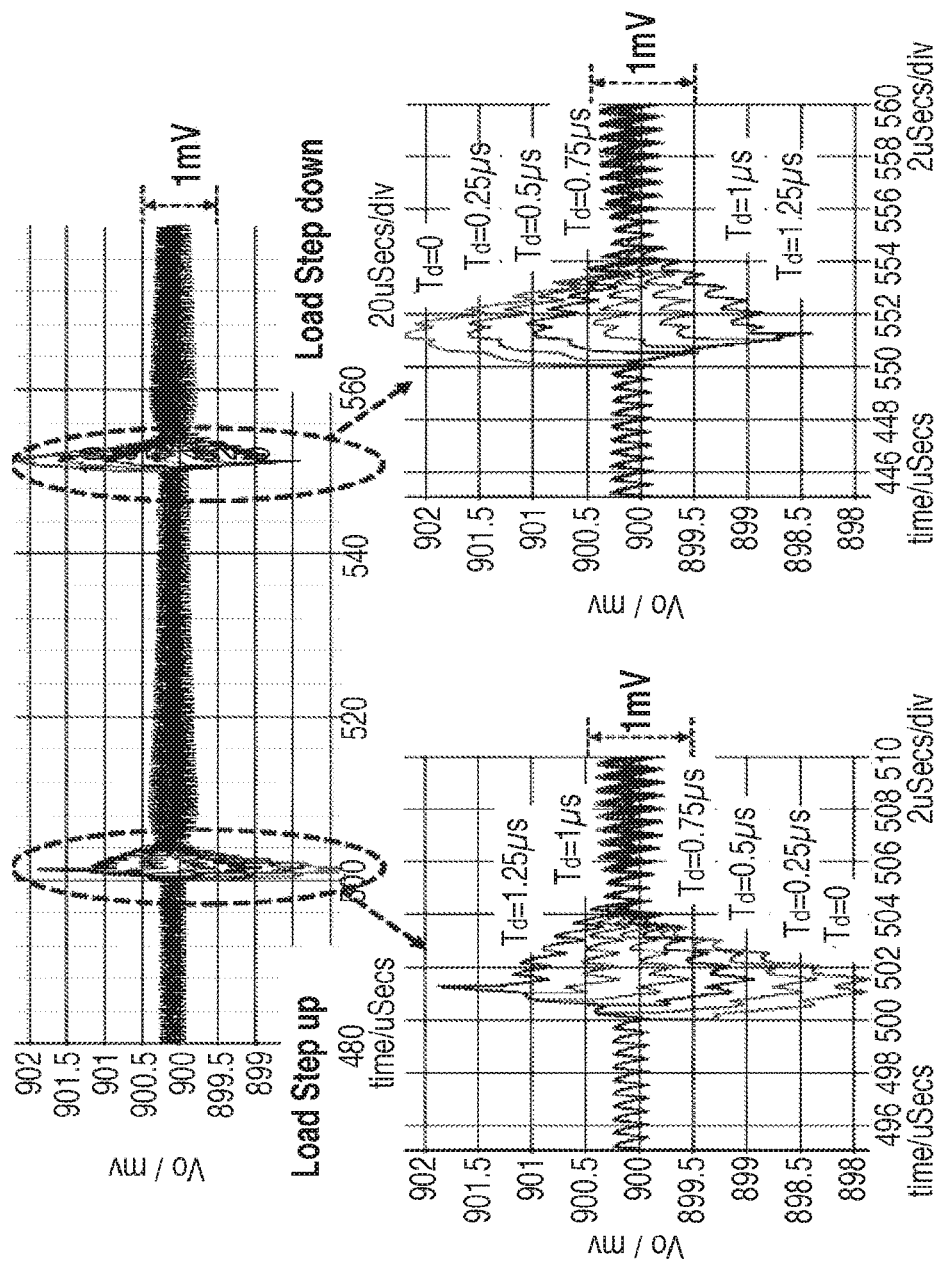
FIG. 12 shows graphs including an exemplary transient response to an exemplary 40 A load current step with variable time delays between a load transient and a current comparator offset adjustment.

FIG. 12 shows the transient response of a 4-phase current mode regulator responding to a 40 A load current step with variable time delays between the load transient and the current comparator offset adjustment. The peak-peak output voltage ripple is shown to be reduced from 50 mV (FIG. 11) to under 2 mV for all conditions. The circuit used to generate the signals of FIG. 12 implemented all ceramic capacitors in the output path. Under the same conditions, and using an output stage composed of POS capacitors and ceramic capacitors, a reduction in voltage ripple of more than a factor of 5 was achieved. POS capacitors have approximately 5 mOhm ESR (equivalent series resistance) versus the near 0 ESR of the ceramic capacitors. The extra ESR causes larger voltage transients for a given load current step. These simulations indicate that, if the timing of the adjustment signal is within 1.25 uS of the current load transient, a significant reduction in output ripple may be achieved with typical switching frequencies of the power stage. As shown in the example of FIG. 12, a timing delay of 0.75 uS was the optimal delay to cause the adjustment of the power switch peak current to coincide with the current step. If the delay is too great, the adjustment may not occur in time for the current step (VOUT spikes down) and, if the delay is too short, the offset itself may cause output voltage ripple (VOUT spikes up).

Using Current Loop Offset to Rapidly Change Regulated Output Voltage

Figure 13:
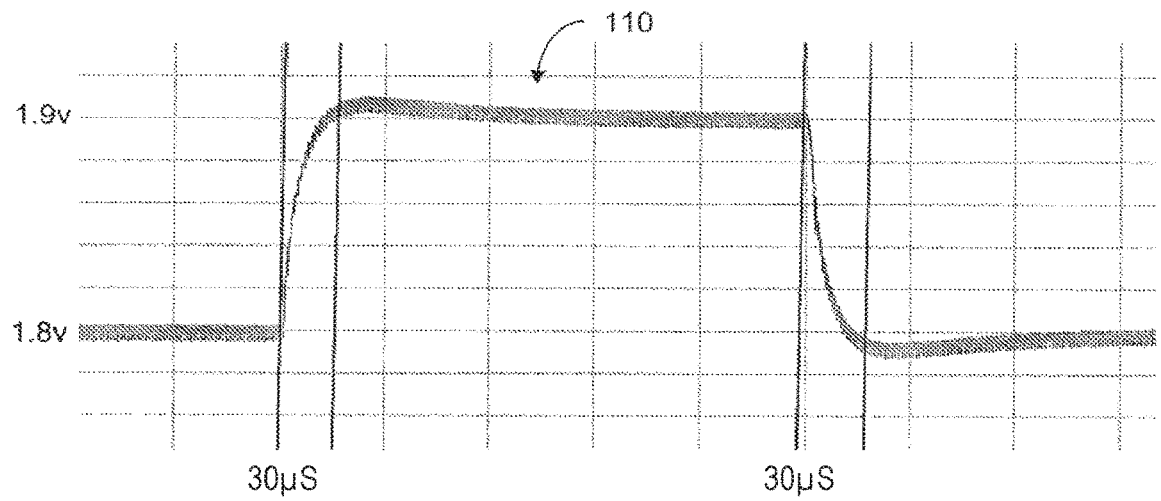
FIG. 13 is a graph of an exemplary 0.1 volt increase and decrease in an output voltage of a regulator, including a 30 µS delay between a time that a reference voltage in a voltage loop is modified and a time at which the regulator reaches a final output voltage.

FIG. 13 illustrates a response to a command signal for stepping the output voltage in a regulator between 1.8 volts and 1.9 volts. In conventional regulators, a reference voltage in the voltage feedback loop may be modified to regulate the output voltage. The circuits of FIGS. 1 and 2 are modified to change the VREF applied the error amplifier 44 based on a control signal for a voltage step applied to the reference voltage generator 109. Since the regulator is configured to adjust the duty cycle of the power switch to cause the feedback voltage to match the new reference voltage VREF, a wide range of output voltages may be achieved. The voltage loop is slow to react to the "error" signal output from the error amplifier because of the compensation capacitor 46 and the output capacitor 36. Capacitor 36 may have a minimum capacitance required to provide sufficient phase margin to avoid oscillations.

FIG. 13 illustrates a delay of 30 μS between the time that the reference voltage is modified and the time that the regulator achieves a final output voltage of 1.9 volts. Due to the relatively slow response of the voltage feedback loop, many switching cycles may be needed to regulate the output voltage. The same delay is incurred when the feedback voltage is modified to reduce the output voltage from 1.9 volts to 1.8 volts. The delay may be greater for larger voltage steps.

Figure 14:
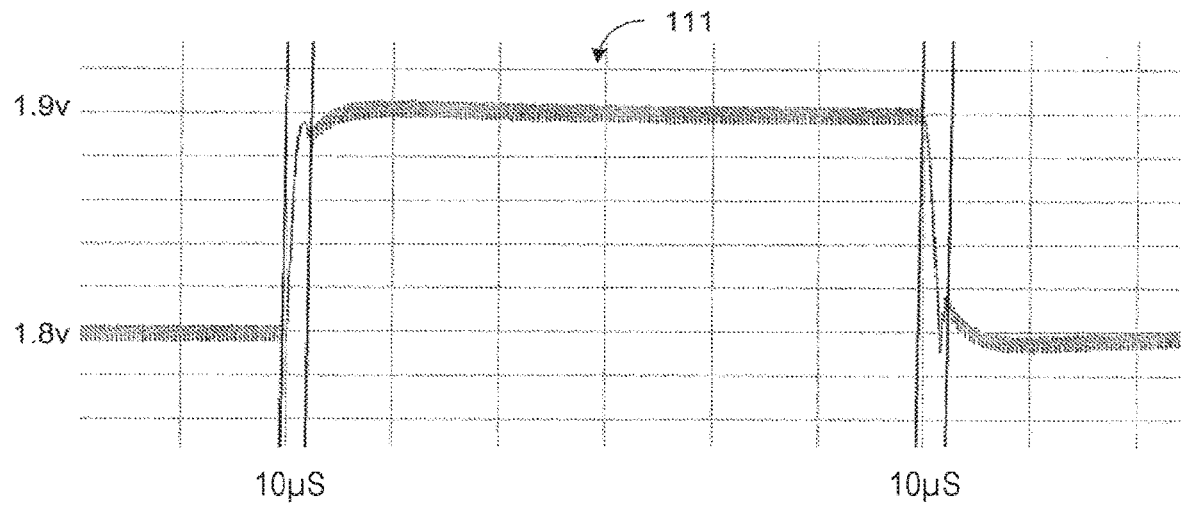
FIG. 14 is a graph of an exemplary 0.1 volt increase and decrease in an output voltage of a regulator, including an improved 10 µS delay between a time that an external offset signal is applied and a time at which the regulator reaches a final output voltage.

FIG. 14 is a graph of an example 0.1 volt increase and decrease in an output voltage of a regulator, including an improved 10 μS delay between a time that an external offset signal is applied and a time at which the regulator reaches a final output voltage. FIG. 14 illustrates adjusting the output voltage to a new value based on an external offset signal being applied for a fixed time by way of the offset circuit of the described technology, producing the adjustment faster than the voltage loop can achieve.

Figure 15:
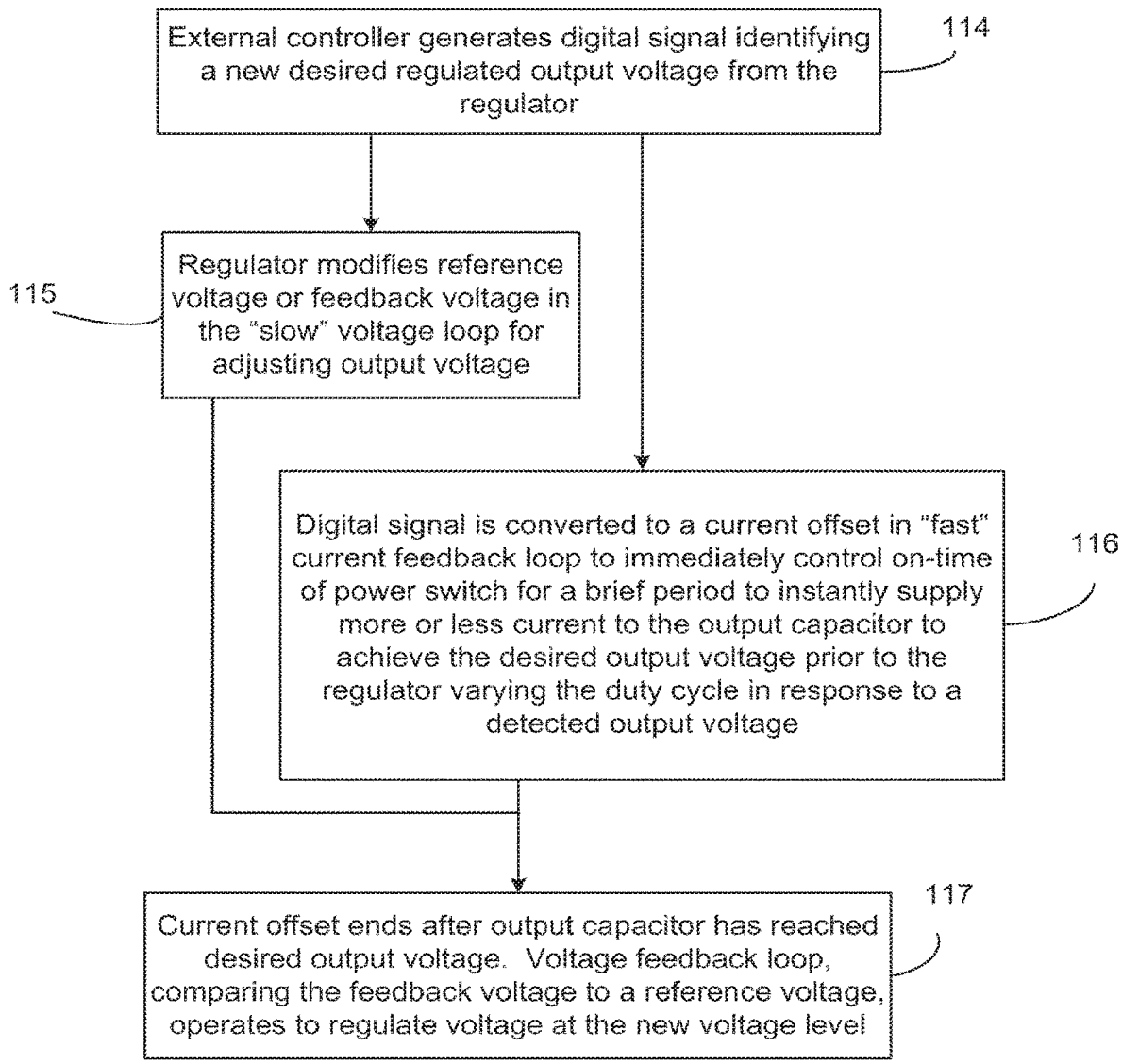
FIG. 15 is a flowchart identifying various exemplary steps for responding to a command to change the output voltage.

FIG. 15 is a flowchart identifying various exemplary steps for responding to a command to change the output voltage. In step 114 of FIG. 15, an external controller, such as one controlling the load or multiple loads, generates a digital signal identifying a new desired regulated output voltage from the regulator. In some implementations, the digital signal may identify the voltage step rather than the absolute voltage.

In step 115, in response to the digital signal, the regulator decodes the signal and modifies the reference voltage or feedback voltage in the (slow) voltage loop to regulate the output voltage. The feedback voltage may be modified, for example, by changing the resistance ratio in a resistor divider (e.g., $R_{TOP}$ and $R_{BOTTOM}$) connected between the output voltage and the error amplifier. The resistance may be changed by switching in or out resistors in parallel.

In step 116, in addition to changing the reference voltage or feedback voltage, the digital signal is converted by a decoder 64 (FIG. 1), a DAC 66, and a offset summer circuit 68 to an analog current offset within the fast current feedback loop to immediately control the on-time of the power switch 28 for a brief period to instantly supply more or less current to the output capacitor 36. Accordingly, the target output voltage is reached faster than in response to a correction by the voltage loop (e.g., in response to the feedback voltage not matching the reference voltage). Since a desired output voltage step may be at least partially dependent on an output capacitance, the current applied to a capacitor, and the duration of the current, a predetermined offset magnitude and/or duration (which controls the power switch on-time) may be stored in a look up table in the decoder 64, and addressed by a digital signal identifying the new desired output voltage. Accordingly, the external current offset signal may quickly step the output voltage to the target voltage before the time that the voltage loop would have achieved the target voltage in response to the feedback voltage not matching the reference voltage.

In step 117, after the target output voltage is achieved by the application of the external current offset signal (e.g., to offset summer circuit 68 or summer circuit 72), the current offset ends and the voltage loop operates by controlling the duty cycle to match the feedback voltage to a reference voltage, causing the regulator to continue regulating the target output voltage.

With reference to graph 111 of FIG. 14, a reduced delay in adjusting to the target output voltage is seen by using the previously described technique of FIG. 15. The delay between receiving the digital signal commanding a 0.1 voltage step, and the time the regulator outputs the target voltage (1.9 volts) is about 10 μS, rather than the 30 μS delay without the use of an external current offset signal. Thus, the depicted example illustrates a 3× improvement in the voltage transient response using this technique.

Fast Serial Peripheral Interface (SPI) Receiver

FIG. 16 shows an exemplary digital control circuit for use in connection with an offset circuit, to adjust the current comparator offset in accordance with some implementations of the described technology. The digital control circuit may include a fast SPI receiver. The receiver may be used in connection with a current mode controller such as the LTC3873 DC/DC Controller, available from the Linear Technology Corporation (LTC) website, incorporated herein by reference. The digital control circuit, in connection with the offset circuit of the described technology, improves the positive and negative transient response of a current mode power supply to current load steps, and facilitates emulation of a current load. Some or all of the following criteria may further facilitate this improvement:

1. The magnitude of the load step, both positive and negative, is well defined.

2. A timely signal is sent (e.g., by a load controller circuit), such as 1 uS-0.5 uS prior to the load transient.

3. The magnitude of the offset to be used by the regulator controller chip may be determined based on power stage calculations.

a. The external offset signal (e.g., magnitude and duration) may be calculated using a design tool that takes into account the characteristics of the regulator.

b. Adjustments may be made for the number of phases needed for the current compensation by the regulator.

c. The digital control circuit does not have to make any calculations, avoiding additional system latency.

In some implementations, if the offset is provided within 500 ns of the current load step, the described technology may reduce the voltage peak-peak ripple induced as a response to a current load by more than a factor of 4.

The digital control circuit (including, e.g., a fast SPI receiver) may also adjust the current comparator offset in response to an external command signal to step the regulated output voltage up or down. As discussed above, a digital command signal may identify a new target voltage, and the reference voltage or feedback voltage may be modified in the voltage feedback loop—and an external offset signal may be briefly applied in the fast current loop—to instantly provide more or less current to the output capacitor to quickly achieve the target output voltage faster than a slower voltage loop would have achieved the same target output voltage by responding to the feedback voltage not matching the reference voltage.

A SPI receiver provides a simple interface that uses a clock signal (CLK_SPI), data signal (SPI_DI), and a chip select (for multi-phase applications) and output latching clock signal CSB_SPI. A corresponding protocol may include a single 8-bit or 16-bit serial data stream that contains a mode bit (load current step or output voltage step), 2 channel address bits, and data bits. If a current step mode is selected, the data stream may include 8-bit serial data, and contain 5 bits of data for the offset. If a voltage step mode is selected, the data stream may be extended to 16-bits and contain 13-16 bits of VREF data for higher resolution and wider dynamic range.

FIG. 17 shows exemplary data stream and clock signals for use in connection with the digital control circuit of FIG. 16 (e.g., in a current step mode), according to various aspects of the described technology. The clock rate of input CLK_SPI may be up to 20 MHz and the data may be received in MSB first fashion. An edge sensitive output register 120 placed between the SPI serial shift register 122 and the offset input eliminates multiple offset transitions when receiving a new offset setting. This register 120 is clocked with the rising edge of SPI_CSB to allow the shift register 122 to be loaded at an arbitrary time in advance of an offset setting change, minimizing timing uncertainty of the commanded value.

FIG. 18 shows exemplary digital bits for use in connection with the digital control circuit. Address bits A1 and A0 may be used to route data bits D4 thru D0 to the proper offset circuit. Data can be sent to CH0 V/I, or CH1 V/I, or both channels. The exemplary digital bits may be used, for example, in a current step mode.

Timing Analysis

For a current step mode, using tPER(max), the total latency from start of serial transmission until the 5 bit offset code is received may nominally be calculated as: 8*50 nS+20 nS (CSB_SPI min. hold time)+(approximately 10 nS offset propagation time)=approximately 430 nS. If desired, the rising edge of CSB_SPI may be delayed beyond the minimum hold time, further decoupling the serial data transfer process from the actual offset signal update.

Example Load Step Compensation

Figure 19:
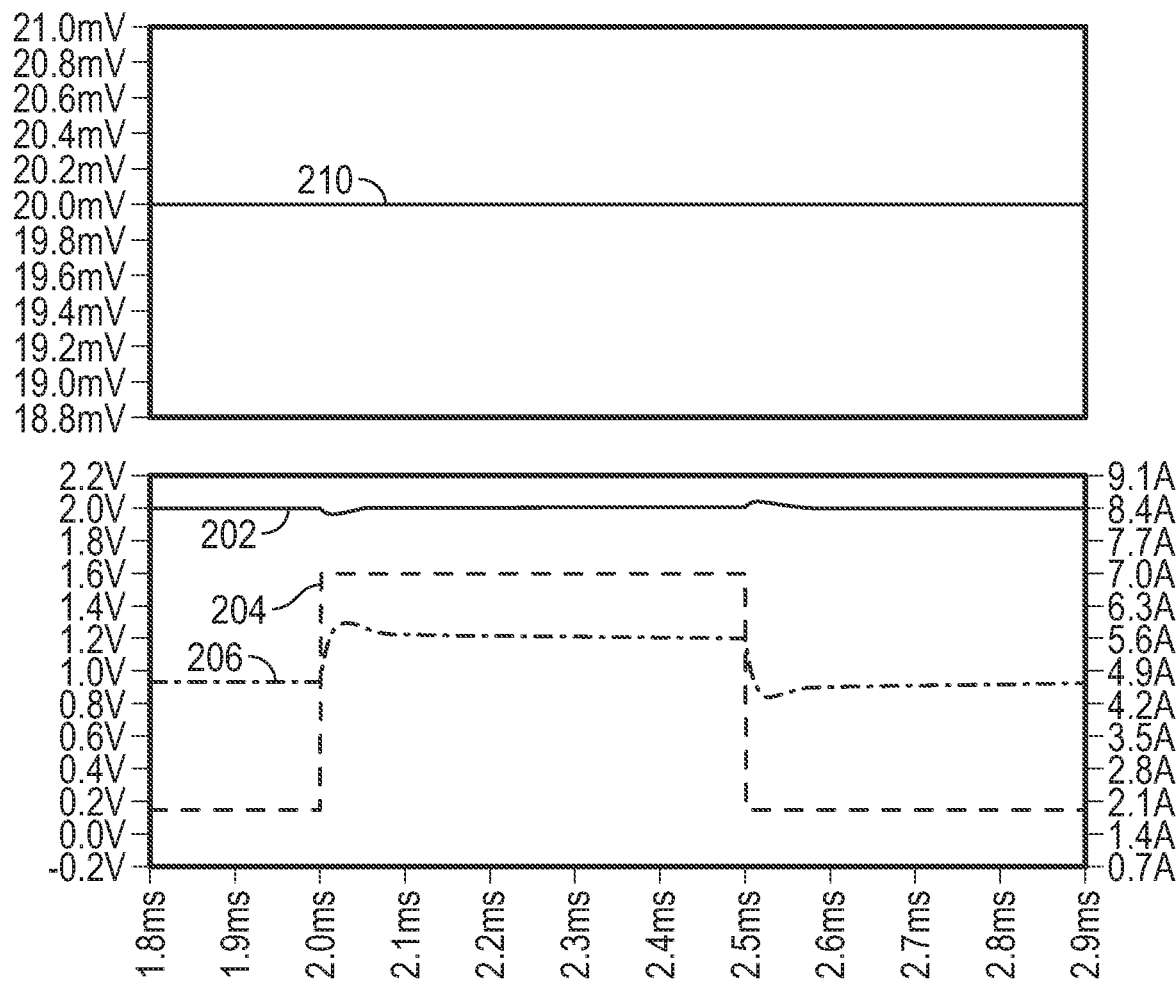
FIG. 19 is a graph of an exemplary load transient response of an exemplary current mode switching regulator circuit.
Figure 20:
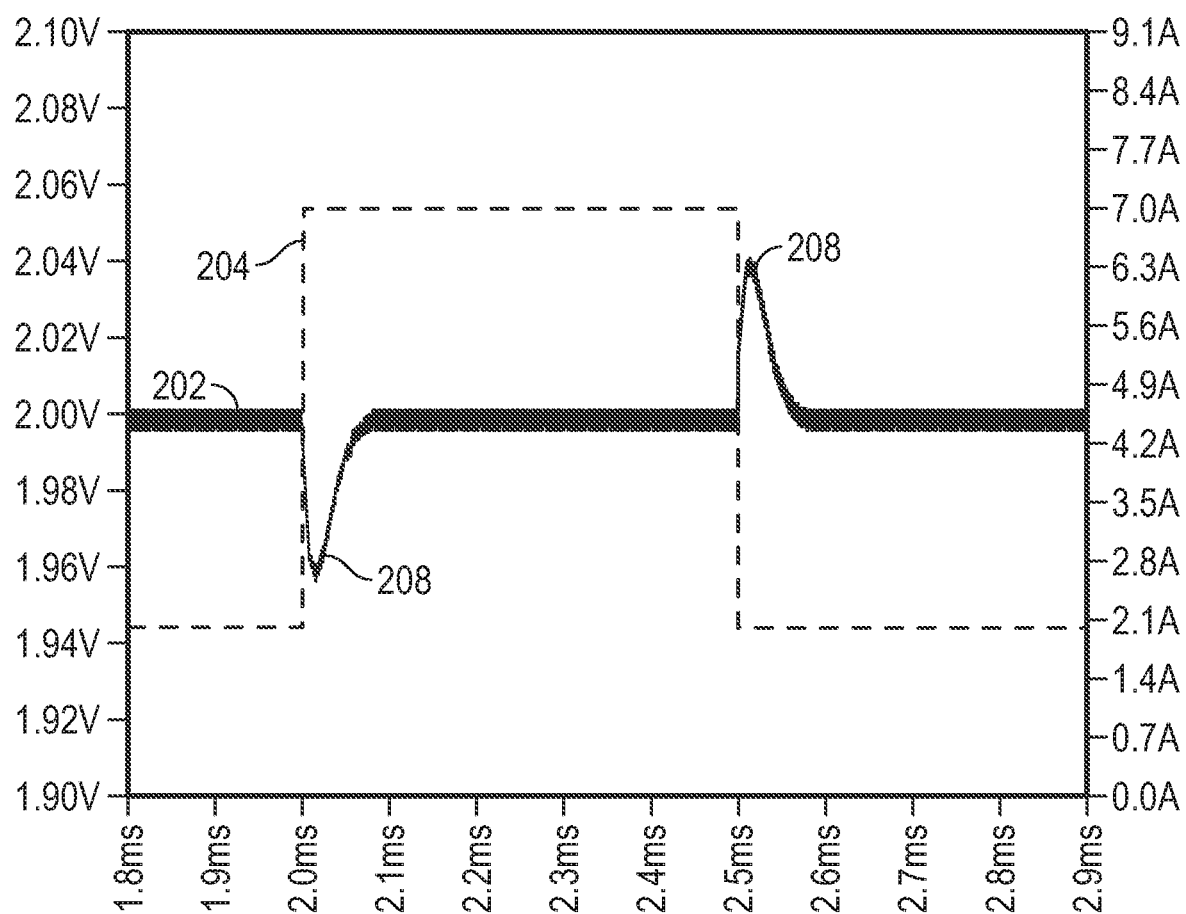
FIG. 20 is a magnified graph of the load transient response.

FIG. 19 is a graph of an exemplary load transient response of an exemplary current mode power delivery network (PDN) responding to a 2-7 A load step, and a 7-2 A load step 500 us later. Line 202 represents the output voltage of a power supply VOUT, and line 204 represents the external load current which creates the transient load step response in this plot. Line 206 represents Vc, which represents the output of the error amplifier (EA) and is proportional to the power supply load current. Line 210 represents an external offset signal (e.g., in a steady state) applied at offset summer circuit 68. FIG. 20 is a magnified graph of the transient load step response (line 202) depicted in FIG. 19. The peak-to-peak transient response 208 may be measured in the circuit with an oscilloscope connected between VOUT and ground.

In the depicted example, a voltage loop within the regulator circuit responds to the load step within the first 2 uS, or one clock cycle. VOUT has approximately a ±40 mV transient, and recovers in approximately 60 us. The magnitude and shape of the VOUT transition are indicative of the control loop bandwidth and phase margin of the PDN. As will be described further, using the offset circuit of the described technology, the same transient may be generated without the introduction of a current load in the circuit.

Emulated Load Step

In addition to compensating for an anticipated current load step, the described technology provides a power supply designer with a tool for commanding a transient load step response in the application with no external circuitry. Using PWM control characteristics, PDN stability may be evaluated at final test or in the field assuring proper design, assembly and component operation using an oscilloscope, or by detecting the peak-peak variation of the supply using a comparator and a DAC.

One method of testing a power supply may be to adjust the output voltage (e.g., by increasing it to a higher voltage), command it to a lower voltage, and then measure the transient response of the overall system. Changing the output voltage of the power supply, however, may not provide an accurate result with regard to current and/or voltage. Accordingly, the described technology implements an adjustable external offset signal to emulate a transient load step response in a current commanded circuit, without modifying the overall output voltage of the circuit.

Figure 21:
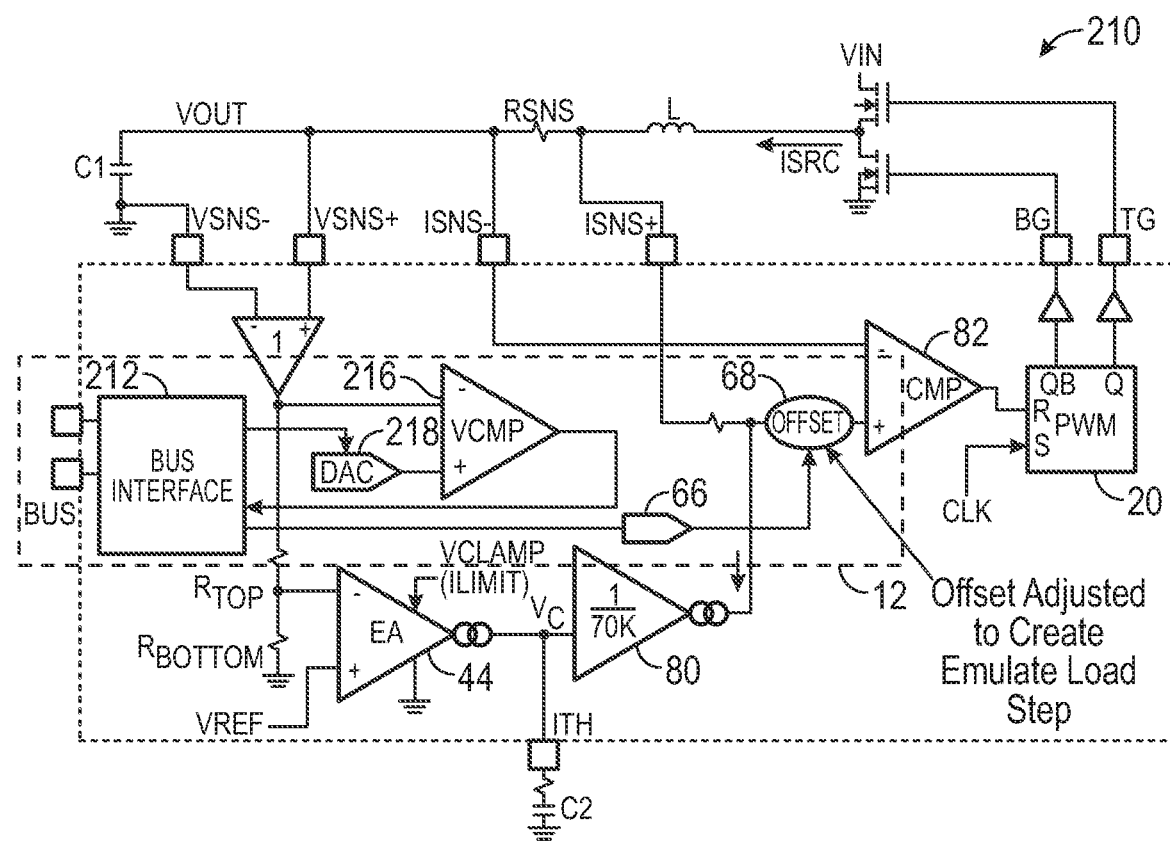
FIG. 21 shows a third exemplary current mode switching regulator circuit augmented with exemplary offset circuitry.

FIG. 21 shows a third exemplary current mode switching regulator circuit 210 augmented with exemplary offset circuitry, according to various aspects of the described technology. As in FIGS. 1 and 2, the output voltage VOUT of circuit 210 is produced by an average duty cycle of a current source ISRC across L, filtered by the C1 (e.g., nominally equal to duty cycle times VIN). The duty cycle of circuit 210 is set by a power switch controller, including a comparator 82 and a corresponding RS flip flop (or latch) 20 controlled by a clock (CLK) signal and the output of the comparator. The clock (CLK) input to the RS latch sets TG on and BG off, and TG turns off when the main comparator CMP 82 resets the RS latch, and BG turns on.

The peak inductor current at which the comparator (CMP) 82 resets RS latch 20 is determined, at least in part, by Vc, which is the output of the error amplifier (EA) 44. A voltage feedback loop sets the voltage at the positive input of CMP 82 based on a feedback voltage and VREF at EA 44. In the depicted example, the difference between VSNS+ and VSNS− is measured, buffered (e.g., with a gain of 1), divided down between $R_{TOP}$ and $R_{BOTTOM}$, and input into a first terminal of EA 44 (e.g., at the negative terminal). EA 44 produces corresponding current ITH (measured across, e.g., $R_{ITH}$), which is proportional to the difference between the divided input and a band gap reference VREF, which is input into a second terminal (e.g., the positive terminal).

The output of EA 44 is also connected to a current buffer 80, which acts as a current source for ISNS+ and gradually compensates for the offset between ISNS+ and ITH. When VOUT is too low, this system increases ITH. As ITH goes up, the voltage at the positive input of CMP 82 increases, and as ITH goes down, the voltage at the positive input of CMP 82 decreases.

The output voltage VOUT, through feedback of the error amplifier, is regulated to a regulated value based on [($R_{TOP}$+$R_{BOTTOM}$)/$R_{TOP}$]*VREF. If VOUT initially starts low, Vc will increase causing the CMP 82 to command more inductor current. As the inductor current increases, VOUT increases. Conversely, if VOUT is too high, then Vc decreases, reducing the inductor current, reducing VOUT. In the depicted example, the circuit reaches equilibrium when VOUT is at the regulated value.

With regard to FIG. 21, a current feedback loop includes a positioning of RSNS to provide current sensing to the inputs of comparator CMP 82, the output of which controls the RS latch. In one example, RSNS is 1 milliohm such that 50 amps produced by ISRC produces 50 millivolts across RSNS. In this configuration, CMP 82 may turn off when ISNS+ becomes 50 millivolts greater than ISNS−. A 1 milliohm RSNS may produce 1 millivolt across the inputs of CMP 82 for a 1 amp response.

Circuit 210 includes an offset summer circuit 68 at an input terminal of CMP 82 (e.g., at the positive terminal). While offset summer circuit 68 is depicted as including a voltage summer, offset summer circuit 68 may include a current summer. In the depicted example, offset summer circuit 68 sums a voltage associated with ISNS+ and an external offset voltage provided by an external source, and provides the sum to the positive input of CMP 82. The introduction of offset summer circuit 68 provides an offset control signal to CMP that is independent of the voltage feedback loop. On an instantaneous change to the positive input node of CMP 82, the output of CMP 82 triggers latch 20 to immediately adjust the duty cycle, which produces a current change in L similar to a load step.

Load step emulation is activated by (e.g., instantaneously) increasing an offset control voltage at the input terminal of CMP 82 by application of the external offset voltage. In this regard, a sudden change in the external offset voltage—and a corresponding change in the offset control voltage—initiates a transient load step response condition by causing CMP 82 to command a lower peak inductor current, which causes VOUT to decrease/droop. The drop in VOUT forces the error amplifier to increase Vc to increase the peak inductor current back to the steady state value. Vc increasing results in VOUT increasing until the voltage loop is back in equilibrium and VOUT returns to its regulated voltage. When the offset is removed, the opposite operation occurs. VOUT initially goes high and returns back to steady state. The magnitude of the emulated load step is equal to the change in offset divided by the resistance of the sense resistor RSNS. This allows precise control of the magnitude of the current transient utilizing the accurate sense element of the current control loop.

The sudden change in duty cycle emulates a load step, in part because the change occurs much faster than the voltage loop can react. If, for example, the output of offset summer circuit 68 is suddenly increased by 10 millivolts to 60 millivolts, CMP 82 may stay on longer until ISRC produces 60 amps—a 10 amp step—and until the overall voltage loop of the system recognizes the increased output and forces ITH low, to equalize the system at 60 amps. If the offset voltage is reduced to 50 millivolts, ITH increases to compensate from the drop in the sensed output voltage.

An adjustment by offset summer circuit 68 occurs inside the current loop, and thus the overall voltage loop and output voltage remain unaffected. Therefore, the transient load step response is more accurately modeled at VOUT. For example, by introducing an external offset voltage at offset summer circuit 68, inside the current loop, CMP 82 reacts as if a transient was produced at VOUT, and tries to adjust by commanding the current source to produce more current. Thus, CMP 82 reacts as if there was an adjustment to ITH, but before any change occurs in the voltage loop.

Bus Interface

The magnitude and/or duration of the emulated load step may also be commanded via a bus 212. In this regard, the bus may be a SPI (serial peripheral interface), I²C, PMBus, or any other mechanism for communicating parameters to the power supply circuit. Bus Interface 212 may provide the external offset voltage to offset summer circuit 68, which is then added to the positive input node of CMP 82 to introduce a change in the duty cycle controlled by PWM.

In some implementations, a DAC 66 may be connected between the bus interface and offset summer circuit 68. In this configuration, the offset voltage may be provided by the DAC 66 based on input from bus interface 212. For example, a two bit DAC may provide four voltage states (00, 01, 10, 11) corresponding to four predetermined voltage increments. In this regard, a selection of one of the states may be made programmatically at bus interface 100.

Voltage Comparator

The offset circuitry 12 may also include a voltage comparator VCMP 216 which compares VOUT (magnitude of the peak) with an input from a DAC 218 to measure the level of the load step response produced as a result of the external offset voltage provided by bus interface 212. In this regard DAC 218 may be programmed to produce a voltage corresponding to a target transient response. The comparator determines whether the targeted plus and minus peak to peak transient was met.

The negative input terminal of VCMP 216 may be set to a differentially sensed output voltage. In the depicted example, that voltage is VOUT, buffered with a predetermined (e.g., +1). The DAC output value may be set to a predetermined threshold value corresponding to the positive or negative peak of the expected transient response. DAC 218 may be adjusted via a bus, while the load step is being commanded on/off. The maximum and minimum DAC values the comparator asserts or de-asserts are directly proportional to the positive and negative peak voltages of the transient load step response. These positive and negative peak values are subtracted to calculate the peak-peak voltage variation in the VOUT, and may be used verify the power supply is working within expected parameters.

Bus interface 212 may monitor the output of VCMP 216 to determine whether the transient load step response occurs. In one exemplary design, where the load step (emulated or actual) may be expected to be about 40 mV, DAC 218 may be programmed to detect a change greater than 39 mV. The value may be set in real time, without any constraints, for different expected transients. A power supply designer may define what the peak of load should be, and use DAC 218 and VCMP 216 to measure to see if an emulated load step response was within specifications. The detected threshold may also be reported to an external device via the bus interface (e.g., as a bit series).

Figure 22:
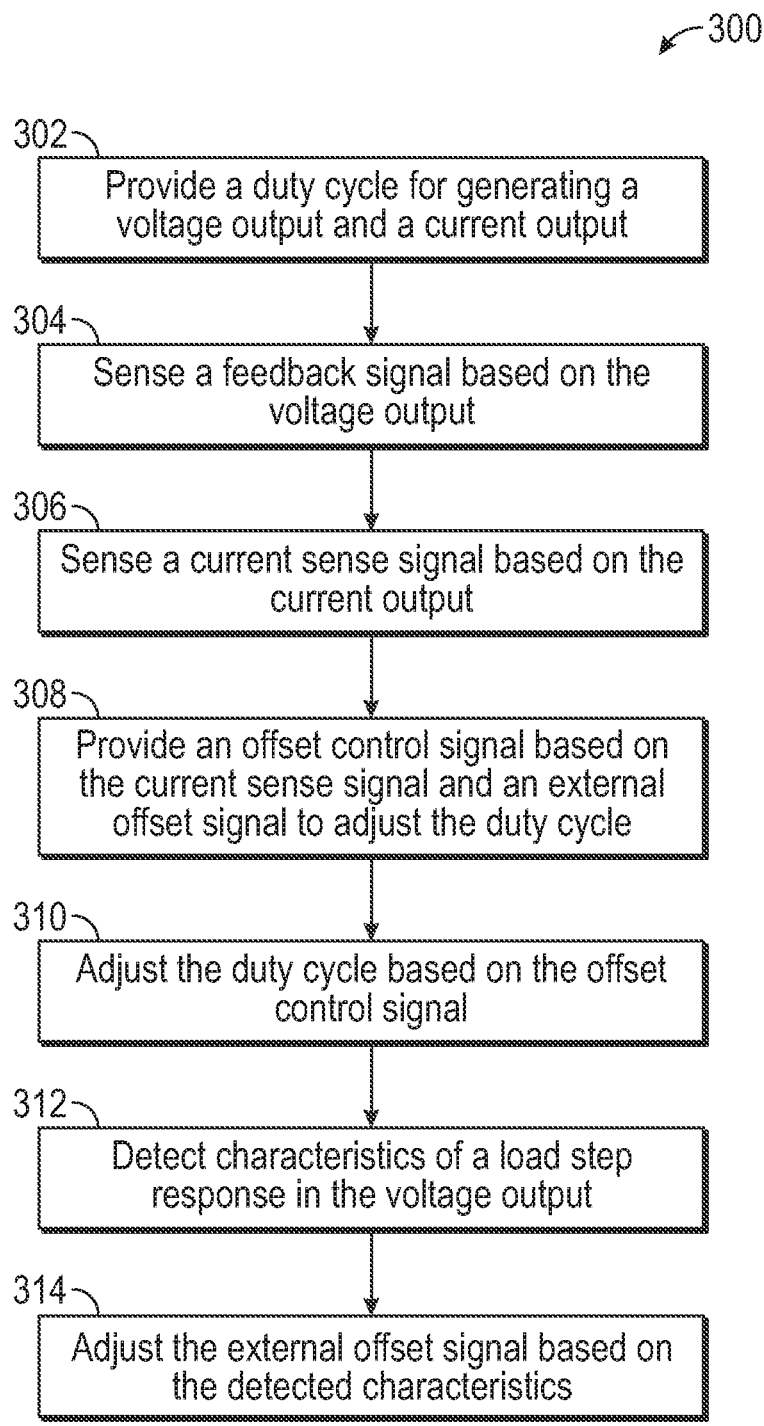
FIG. 22 is a flowchart of an exemplary process for emulating a load step response in an exemplary regulator circuit.

FIG. 22 depicts an exemplary process 300 for emulating a load step response in an exemplary regulator circuit, according to aspects of the described technology. For explanatory purposes, the various blocks of exemplary process 300 are described herein with reference to FIGS. 1, 2, and 21, and the components and/or processes described herein. The one or more of the blocks of process 300 may be implemented, for example, by circuit 10, 20, or 210, including an offset circuit 12. In some implementations, one or more of the blocks may be implemented apart from other blocks, and by one or more different processors or devices. Further for explanatory purposes, the blocks of exemplary process 300 are described as occurring in serial, or linearly. However, multiple blocks of exemplary process 300 may occur in parallel. In addition, the blocks of exemplary process 300 need not be performed in the order shown and/or one or more of the blocks of exemplary process 300 need not be performed.

In the depicted exemplary flow diagram, a duty cycle of one or more switching transistors produces an output voltage and an output current of a switching regulator circuit (302). The duty cycle is generated by a power switch controller, including a latch or flip flop 20 (including, e.g., a PWM switching circuit) controlled by a clock source and a comparator circuit (50, 82) connected to a voltage feedback loop and/or a current feedback loop. A feedback signal (e.g., a voltage) based on the output voltage is sensed in the voltage feedback loop (304), and a current sense signal based on the output current is sensed in the current feedback loop (306).

An offset control signal is provided by an offset circuit 12, independently of the voltage feedback loop, to the power switch controller based on the current sense signal and an external offset signal at an offset input of the offset circuit to adjust the duty cycle (308). The offset control signal is generated without sensing a change in the feedback signal provided by the voltage feedback loop. The offset circuit may be connected to the current feedback loop and/or the voltage feedback loop, as depicted by FIG. 1, 2, or 21.

The duty cycle is adjusted based on the offset control signal (310). According to various implementations, the duty cycle is adjusted based on the offset control signal and a clock signal. As described previously, the duty cycle may also be adjusted based on a set signal 73 generated by a decoder 64. In some implementations, the offset circuit 12 comprises a summer circuit 68, and a sense resister RSNS in a current path of the output current. The sense resister may be connected across a first input of the comparator and a sense input of summer circuit 68. Summer circuit 68 provides the offset output control signal to a second input of the comparator, and the comparator provides a duty cycle control signal that adjusts the duty cycle based on a comparison of a first signal received at the first input of the comparator to the offset output control signal received at the second input of the comparator.

In some implementations, offset circuit includes a bus interface 212 (or load controller 62 and/or decoder 64) configured to provide the external offset signal to the sense input based on one or more external bus input signals (e.g., provided to the bus interface). A digital to analog converter (DAC) 66 may also be connected between the bus interface and the offset summer circuit. In this regard, the DAC may be configured to provide the external offset signal based on one of a predetermined number of bit signatures received from the bus interface.

In response to a change in the external offset signal, the duty cycle is automatically adjusted (e.g., by the power switch controller) to introduce a load step response in the output voltage, without an additional load on the output voltage being detected. According to various aspects, the magnitude of the load step response may be proportional to the offset signal. The load step response may then be corrected by the power switch controller based on the feedback signal a period of time after the load step response is introduced. As described previously, the period of time for correction may be at least 5 microseconds. Additionally or in the alternative, the period of time may be two or more clock cycles of the power switch controller.

With further reference to exemplary process 200, characteristics (e.g., current and/or voltage magnitude and/or duration) of the load step response in the output voltage is optionally detected by a load step detection circuit (312). With reference to FIG. 21, the load step detection circuit may be part of offset circuit 12, and/or may include a comparator 216 connected to the voltage feedback loop, and a digital to analog converter (DAC) 218 connected between the comparator 216 and the bus interface 212. DAC 218 may be configured to provide to the comparator 216 an analog signal representative of a predetermined target peak response based on a bit signature received from the bus interface 212, and wherein the comparator is configured to compare the analog signal with the feedback signal to detect the predetermined target peak response of the output voltage.

In response to detecting the magnitude of the load step response, the load step detection circuit optionally adjusts the external offset signal based on the detected characteristics of the load step response (314). In this manner, bus interface 212 may make adjustments to the offset input signal in real time to control the duty cycle to produce a load step response with a predetermined set of characteristics (e.g., duration and magnitude). Additionally or in the alternative, the results of load detection circuit, including whether a target peak response was detected and/or a magnitude and/or duration of the step response, may be reported by bus interface 212.

The setting of the magnitude and duration of the external offset input signal, and thus the characteristics of the load step response (or correction of a load step response), may be implemented by bus interface 212 (and/or load controller 62 and/or decoder 64) by way of software processes that are specified as a set of instructions recorded on a computer readable storage medium (also referred to as computer readable medium), and may be executed automatically (e.g., without user intervention). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections. The term "software" is meant to include, where appropriate, firmware residing in read-only memory or applications stored in magnetic storage, which can be read into memory for processing by a processor.

Example Emulated Load Step

Figure 23:
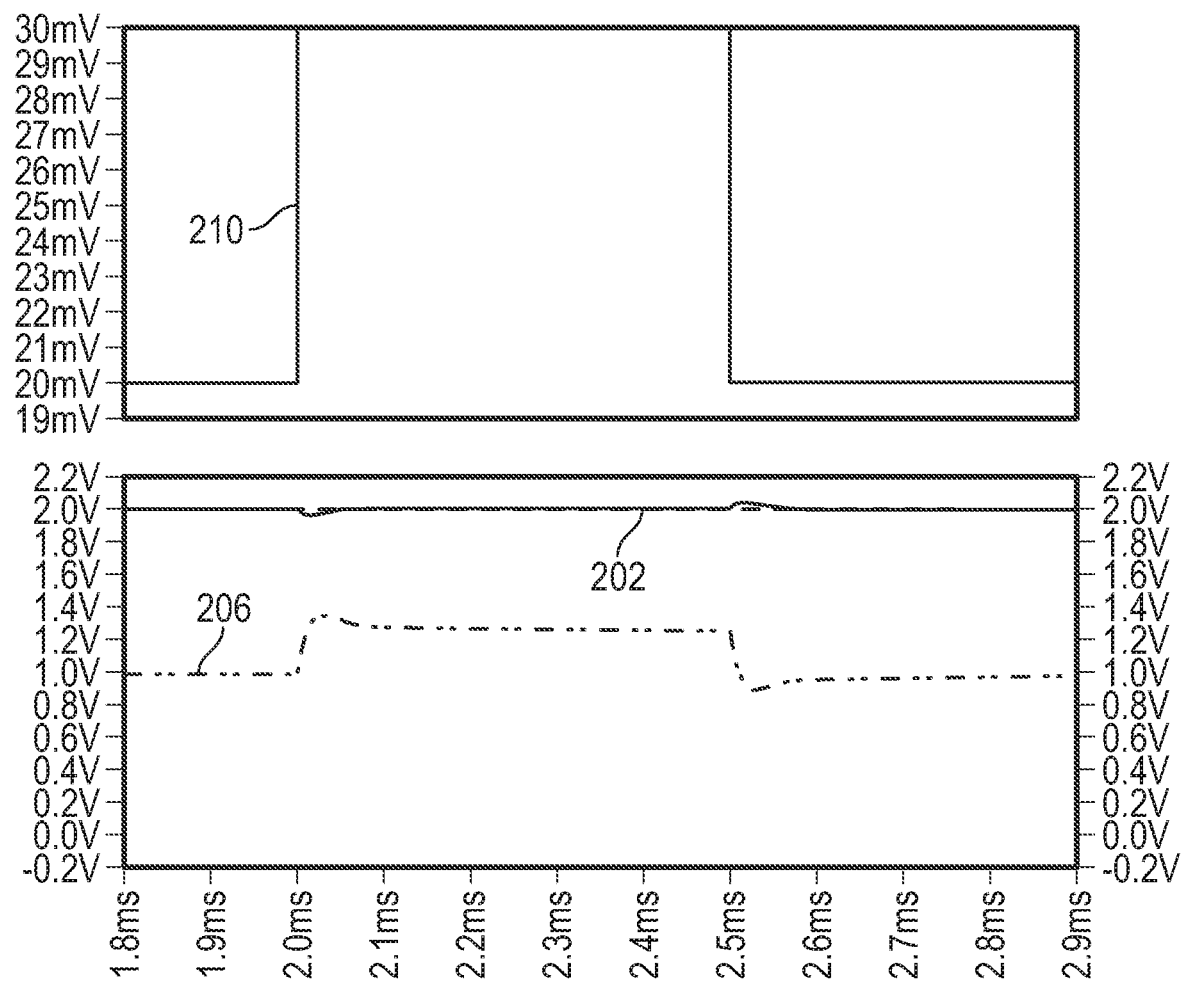
FIG. 23 is a graph of an exemplary transient response of an exemplary current mode switching regulator circuit responsive to an emulated load step.

FIG. 23 is a graph of an exemplary transient response of an exemplary current mode power supply responsive to an emulated load step, according to aspects of the described technology. The graph of FIG. 23 is similar to the graph of FIG. 8, with the additional display of external offset signal 210. Line 202 of FIG. 23 represents the output voltage of the power supply VOUT. The line 204 represents the load current, shown here with no change in current. Line 206 of FIG. 23 represents Vc. Vc is proportional to the power supply load current, and is responding to an internal offset in the PWM current loop rather than to an external load. Line 210 shows the commanded increase and decrease of the PWM current loop offset used to emulate a load step.

The offset voltage at offset voltage input node is stepped from low to high at time interval t (2 ms). At that instance, Vc increases from an initial value (e.g., 0.95 V) to compensate for the increase in the offset voltage, and settles at a final value (e.g., 1.2 V). At the same time, a transient response is seen at VOUT, which decreases with the increase in Vc, and then resettles at its initial value. The offset voltage is then stepped from high to low at time interval t+i (2.5 ms), and Vc reacts by decreasing from the current final value back to the initial value. At the same time, another transient response is seen at VOUT, which increases with the decrease in Vc, and then resettles.

In this manner, an offset voltage may be introduced and an external load current is produced at VOUT that is proportional to the offset voltage. A transient response is a produced at VOUT faster than can be produced via the voltage feedback loop.

Figure 24:
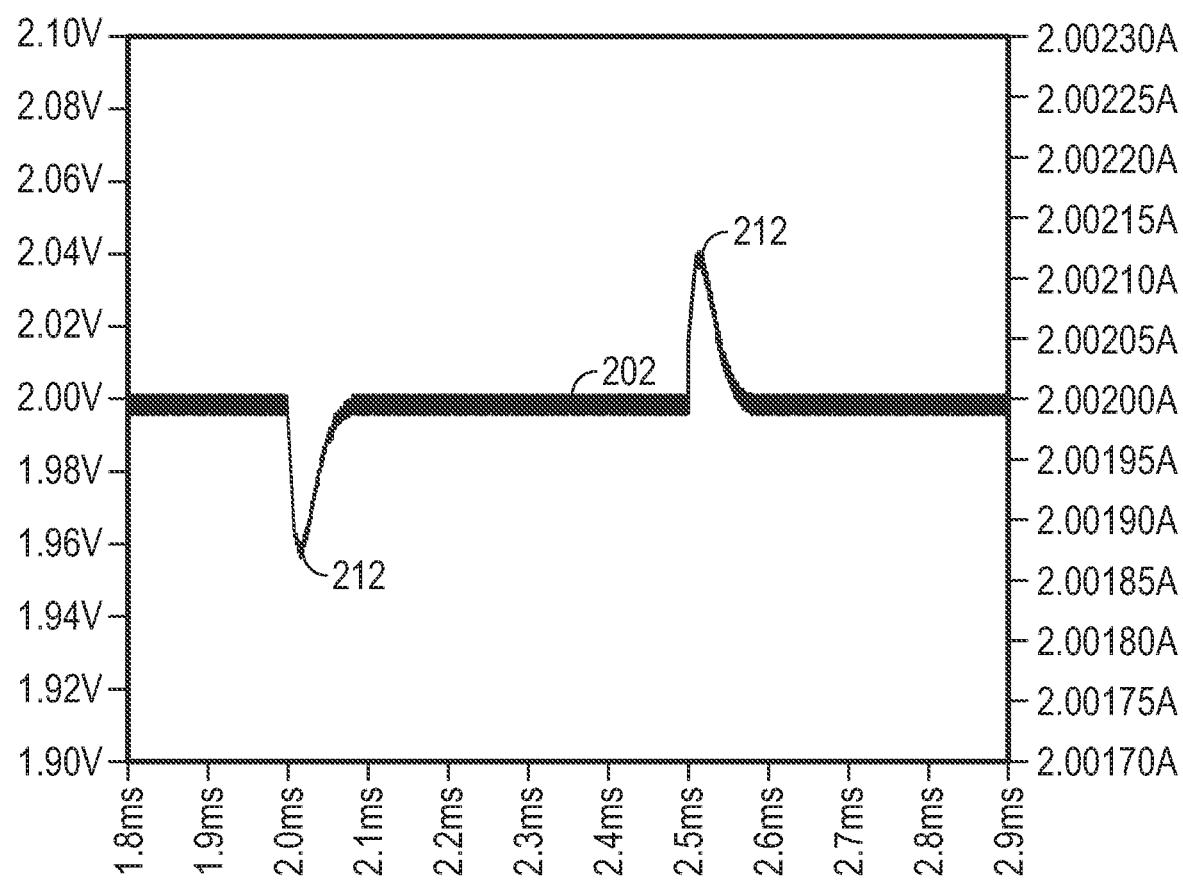
FIG. 24 is a magnified graph of the exemplary transient response responsive to the emulated load step.

FIG. 24 is a magnified graph of the transient response 202 responsive to the emulated load step, which may be measured in a PDN with an oscilloscope between VOUT and ground. The emulated load step occurs by adding the previously described offset, internal to the PWM current loop. The loop begins to respond within the first 2 uS PWM clock cycle of the commanded emulated load step. In the depicted example, the peak-to-peak transient response 212 is approximately ±40 mV and recovers in approximately 60 us. The magnitude and shape of the VOUT transition are indicative of the voltage control loop bandwidth and phase margin of the PDN. The emulated load step is shown being removed 500 us after it is first applied. This transient response produces a close representation of the load transient depicted in FIGS. 19 and 20, without requiring external circuits.

The commanded emulated load step produces a transient response on the PDN output voltage VOUT in a manner similar to a true current load step in the system. This emulated load step may be used to verify or optimize the loop compensation and assure the power supply design is working correctly. The PDN loop stability may be verified at final test on all power supplies before boards are shipped because no additional circuitry is required. Furthermore, the emulated load step may be commanded when the part is in the field. VOUT may be monitored with a comparator and an adjustable DAC to determine the peak-peak variation caused by the load step. The peak-peak variation may be may be used to verify the PDN is working within expected parameters.

Thus, the method emulates a transient load step response in a current mode controlled PDN without requiring external components or an accurate fast adjustable current load. In addition using an adjustable comparator it is possible to determine the voltage variation in VOUT during the emulated load transient. Power supply designers may use this new diagnostic technique to assure proper operation of the supply in the factory and in the field, thereby improving system testability and reliability Although the offset technique described herein is particularly suited to peak current control current mode regulators, the offset technique can be applied to any regulator where the duty cycle of a power switch can be adjusted by applying an offset at the input of a PWM comparator. For example, in one type of regulator, a control voltage is compared to a sawtooth oscillator signal, and the crossing causes the power switch to be turned off. A clock turns the power switch back on at the beginning of the next clock cycle. By providing an offset at either input of the PWM comparator around the time of a current or voltage step, the duty cycle can be immediately controlled to prior to the regulator reacting to any change in the output voltage.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

It is understood that any specific order or hierarchy of blocks in the processes disclosed is an illustration of exemplary approaches. Based upon design preferences, it is understood that the specific order or hierarchy of blocks in the processes may be rearranged, or that all illustrated blocks may not be performed. Some of the blocks may be performed simultaneously.

A phrase such as an "aspect" does not imply that such aspect is essential to the described technology or that such aspect applies to all configurations of the described technology. A disclosure relating to an aspect may apply to all configurations, or one or more configurations. A phrase such as an aspect may refer to one or more aspects and vice versa. A phrase such as a "configuration" does not imply that such configuration is essential to the described technology or that such configuration applies to all configurations of the described technology. A disclosure relating to a configuration may apply to all configurations, or one or more configurations. A phrase such as a configuration may refer to one or more configurations and vice versa. The word "example" and "exemplary" are used herein to mean "serving as an example or illustration." Any aspect or design described herein as "example" is not necessarily to be construed as preferred or advantageous over other aspects or designs.

What is claimed is:

1. A current mode switching regulator circuit, comprising:
    a variable duty cycle power switch controller configured to control the current mode switching regulator circuit to generate an output voltage and an output current from the current mode switching regulator circuit;
    a voltage feedback loop that provides a feedback signal based on the output voltage;
    a current feedback loop that provides a current sense signal based on the output current;
    an offset circuit including:
        a bus interface to provide an external offset signal adding a step offset to the current feedback loop, wherein the offset circuit is configured to vary a duty cycle of the variable duty cycle power switch controller in anticipation of a change in the feedback signal according to the current sense signal and the external offset signal; and
        a load step detection circuit configured to determine a load step response, determine a target load step response using the bus interface, and compare the determined load step response to the target load step response; and
    wherein the offset circuit is configured to adjust the external offset signal according to a difference between the determined load step response and the target load step response.

2. The current mode switching regulator circuit of claim 1, wherein the offset circuit and the variable duty cycle power switch controller are configured to adjust the duty cycle in response to a change in the external offset signal to introduce the load step response in the output voltage, without detection of an additional load on the output voltage or a variation in the output current, the load step response being corrected by the variable duty cycle power switch controller based on the feedback signal upon a period of time after the load step response is introduced.

3. The current mode switching regulator circuit of claim 2, including:
    a comparator to compare the output voltage to the target load step response; and
    wherein the bus interface is configured to provide the external offset signal based on one or more bus input signals provided to the bus interface and receive an output of the comparator.

4. The current mode switching regulator circuit of claim 3, wherein the offset circuit further comprises: a summer circuit providing an offset output control signal; and a digital to analog converter (DAC) connected between the bus interface and the summer circuit and configured to provide the external offset signal based on one of a predetermined number of bit signatures received from the bus interface.

5. The current mode switching regulator circuit of claim 3, wherein
    the offset circuit is configured to adjust a magnitude or duration of the external offset signal based on the difference between the determined load step response and the target load step response.

6. The current mode switching regulator circuit of claim 2, wherein the variable duty cycle power switch controller comprises a comparator, and wherein the offset circuit comprises a summer circuit, and a sense resistor in a current path of the output current, the sense resistor being coupled to a first input of the comparator and the summer circuit, the summer circuit providing an offset output control signal to a second input of the comparator, the comparator providing a duty cycle control signal that adjusts the duty cycle based on a first signal and the offset output control signal applied to the comparator.

7. The current mode switching regulator circuit of claim 2, wherein the offset circuit and variable duty cycle power switch controller are configured to introduce the load step response at a magnitude proportional to the external offset signal.

8. The current mode switching regulator circuit of claim 2, wherein the load step response is corrected by the variable duty cycle power switch controller, based on the feedback signal, at least 5 microseconds after the load step response is introduced.

9. The current mode switching regulator circuit of claim 2, wherein the load step response is corrected by the variable duty cycle power switch controller, based on the feedback signal, two or more clock cycles of the power switch controller after the load step response is introduced.

10. The current mode switching regulator circuit of claim 1, wherein the voltage feedback loop comprises an error amplifier, and wherein the load step detection circuit comprises:
    a comparator coupled to the voltage feedback loop; and
    a digital to analog converter (DAC) coupled between the comparator and the bus interface, wherein the DAC is configured to provide to the comparator an analog signal representative of a predetermined target peak response based on a bit signature received from the bus interface, and wherein the comparator is configured to compare the analog signal with the feedback signal, and the offset circuit is configured to adjust the external offset signal according to a comparison of a peak response of the feedback signal and the predetermined target peak response.

11. A variable duty cycle switching regulator circuit, comprising: means for controlling the switching regulator circuit to have a duty cycle to produce a corresponding output voltage and output current; means for producing a feedback signal based on the output voltage; means for producing a current sense signal to the switching regulator circuit based on the output current; means for generating an analog signal representative of a predetermined target peak response, the analog signal based on an external offset signal received as a bit signature; means for comparing the generated analog signal with the sensed feedback signal to detect the predetermined target peak response of the output voltage; and means for adjusting the external offset signal according to a difference between a peak response of the sensed feedback signal and the predetermined target peak response; and means for adjusting a duty cycle of the switching regulator circuit based on the current sense signal and the external offset signal in anticipation of a change in the feedback signal and any variation in the output current, the external offset signal adding a step offset to a current feedback loop and set independent of the output current.

12. The variable duty cycle switching regulator circuit of claim 11, wherein the adjusting means adjusts the duty cycle in response to a change in the external offset signal to introduce a load step response in the output voltage, independently of detection of any additional load on the switching regulator circuit or a variation in the output current, and in which following a period of time after the load step response is introduced, the controlling means corrects the load step response based on the feedback signal.

13. The variable duty cycle switching regulator circuit of claim 12, wherein the adjusting means adjusts the duty cycle to introduce the load step response at a magnitude proportional to the external offset signal.

14. The variable duty cycle switching regulator circuit of claim 12, wherein the controlling means corrects the load step response based, on the feedback signal, at least 5 microseconds, or two or more clock cycles associated with the duty cycle, after the load step response is introduced.

15. The variable duty cycle switching regulator circuit of claim 12, further comprising:
 means for detecting a characteristic of the load step response in the output voltage.

16. The variable duty cycle switching regulator circuit of claim 15, further comprising:
 means for adjusting a magnitude or duration of the external offset signal based on the detected characteristic.

17. A method of operating a switching regulator circuit of a type having a voltage feedback loop and a current feedback loop, comprising:
 controlling the switching regulator circuit to provide a duty cycle signal for generating a corresponding output voltage and an output current therefrom;
 sensing, in the voltage feedback loop, a feedback signal based on the output voltage;
 sensing, in the current feedback loop, a current sense signal based on the output current;
 generating an analog signal representative of a predetermined target peak response, the analog signal based on an external offset signal received as a bit signature;
 comparing the generated analog signal with the sensed feedback signal to detect the predetermined target peak response of the output voltage,
 adjusting the external offset signal according to a difference between a peak response of the sensed feedback signal and the predetermined target peak response; and
 producing an offset control signal in response to the current sense signal and the external offset signal in anticipation of a change in the feedback signal and any variation in the output current, the external offset signal adding a step offset to the current feedback loop and set independent of the output current; and
 implementing the offset control signal to adjust the duty cycle signal independently of the feedback signal.

18. The method of claim 17, further comprising:
 in response to a change in the external offset signal, adjusting the duty cycle to introduce a load step response in the output voltage, without detection of any additional load on the output voltage or a variation in the output current, and correcting the load step response based on the feedback signal upon a period of time after the load step response is introduced.

19. The method of claim 18, wherein a magnitude of the load step response is proportional to the offset signal.

20. The method of claim 18, wherein the voltage feedback loop comprises an error amplifier, the method further comprising:
 detecting a characteristic of the load step response in the output voltage; and
 adjusting a magnitude or duration of the external offset signal based on the detected characteristic.

* * * * *